United States Patent
Hogge et al.

(10) Patent No.: US 7,247,697 B2
(45) Date of Patent: Jul. 24, 2007

(54) COATING COMPOSITIONS FOR USE IN GOLF BALLS

(75) Inventors: Matthew F. Hogge, New Bedford, MA (US); Mitchell E. Lutz, Fairhaven, MA (US); Michael A. Mayo, Pittsburgh, PA (US)

(73) Assignee: Acushnet Company, Fairhaven, MA (US)

( * ) Notice: Subject to any disclaimer, the term of this patent is extended or adjusted under 35 U.S.C. 154(b) by 239 days.

(21) Appl. No.: 10/971,792

(22) Filed: Oct. 22, 2004
(Under 37 CFR 1.47)

(65) Prior Publication Data
US 2006/0089419 A1    Apr. 27, 2006

(51) Int. Cl.
*A63B 37/14*    (2006.01)
*C09D 4/00*    (2006.01)
*C09D 175/04*    (2006.01)

(52) U.S. Cl. ............................ 528/69; 528/75; 522/90; 522/93; 522/139; 522/173; 525/404; 525/454; 525/455; 473/371

(58) Field of Classification Search ...................... None
See application file for complete search history.

(56) References Cited

U.S. PATENT DOCUMENTS

| 4,677,179 | A | 6/1987 | Hannemann | 528/45 |
| 5,770,325 | A | 6/1998 | Keller et al. | 428/914 |
| 5,785,612 | A | 7/1998 | Shapiro et al. | 473/377 |
| 6,001,898 | A | 12/1999 | Lutz | 523/160 |
| 6,100,361 | A | 8/2000 | Keller | 528/67 |
| 6,485,377 | B1 | 11/2002 | Crast et al. | 473/351 |
| 6,632,877 | B2 | 10/2003 | Crast et al. | 524/839 |
| 2002/0016226 | A1 | 2/2002 | Jin et al. | 473/378 |
| 2002/0055397 | A1* | 5/2002 | Kikuchi et al. | 473/351 |

FOREIGN PATENT DOCUMENTS

JP    2002322417    * 11/2002

* cited by examiner

*Primary Examiner*—David J. Buttner
(74) *Attorney, Agent, or Firm*—Mandi B. Milbank

(57) ABSTRACT

A golf ball comprising a core, a cover encasing the core, at least one coating layer encasing the cover, and at least one indicia layer immediate adjacent to the coating layer is provided. At least one of the indicia and coating layers comprises at least one two-part, reactive composition comprising at least one radiation-curable iso(thio)cyanate and at least one isocyanate-reactive chemical.

7 Claims, No Drawings

COATING COMPOSITIONS FOR USE IN GOLF BALLS

The United States Golf Association ("USGA") provides five (5) regulations to keep golf balls consistent. Specifically, the golf ball must weigh no more than 1.62 ounces and measure no less than 1.68 inches in diameter. The initial velocity of the ball as tested on a USGA machine at a set club head speed must not exceed 255 ft/sec. The overall distance of the ball as tested with a USGA specified driver at 160 ft/sec and a 10-degree launch angle must not exceed 296.8 yards. Furthermore, the ball must pass a USGA-administered symmetry test. Within the confines of these regulations, other performance characteristics of the ball, including distance, durability, feel, spin, sound, and the like may be modified through alterations in material compositions, constructions, diameters and/or thickness, and surface configurations of various portions of the ball, such as the core, the cover, intermediate layer(s) disposed between the core and the cover, and coating layer disposed about the cover. Other physical, mechanical, chemical, and/or optical properties of the portions, including color stability, compression, density, flexural modulus, gas or vapor permeability, hardness, stiffness, tear resistance, weight, gloss, and the like may also be affected by these alterations.

Typically, radiation-curable inks are used to form visible indicia and decals on the golf ball. Conventional radiation-curable inks have narrow application windows when applied to a non-acrylic functional substrate. In the case of golf balls, with radiation (e.g. UV) curable ink applied over a two-part coating layer, this process window may be as small as 8 hours. This narrow window results in part from high crosslink density in the coating layer and quick evaporation of application solvents used with the ink. The high crosslink density in the coating layer may render the adhesion of the ink difficult. As such, it is desirable to formulate golf ball coating compositions having functionalities capable of forming physical and/or chemical attachment with the ink, thereby increasing ink adhesion and improving durability.

As used herein, the term "active hydrogen-containing compound" refers to any one compound or mixture of two or more compounds wherein each molecule comprises one, two, three, four, or more of the same or different primary and/or secondary groups each comprising one or more active hydrogen atoms, such as —OH (hydroxyl group), —NHR (amine group where R can be hydrogen, alkyl, aryl, or alicyclic groups), —SH (thio group), and —COOH (carboxylic acid group). These active hydrogen groups are reactive to free reactive iso(thio)cyanate (i.e., isocyanate and/or isothiocyanate) groups, forming urethane, urea, thiourethane, thiourea, and/or other corresponding linkages. As such, all active hydrogen-containing compounds, including monoahls and polyahls, are iso(thio)cyanate-reactive compounds, although not all iso(thio)cyanate-reactive compounds are active hydrogen-containing compounds. Oligomeric and polymeric polyahls may also be referred to as telechelic polyahls.

As used herein, the term "radiation-curable compounds" refers to any one compound or mixture of two or more compounds wherein each molecule comprises one, two, three, four, or more of the same or different radicals capable of crosslinking with each other under the irradiation of electromagnetic and/or corpuscular radiations of high and/or low energy (e.g., radio wave, microwave, infrared (IR), actinic such as visible and ultraviolet (UV), laser, x-ray, electron beam, γ-ray, α-ray, β-ray, etc.), including radicals that comprises one, two, three, four, or more of the same or different bonds chosen from carbon-hydrogen single bonds, carbon-carbon single and double and triple bonds, carbon-oxygen single and double bonds, carbon-nitrogen single and double and triple bonds, carbon-phosphorus single and double bonds, and carbon-silicon single and double bonds.

As used herein, the term "enic compounds" refers to any one compound or mixture of two or more compounds wherein each molecule comprises one, two, three, four, or more of the same or different reactive unsaturated monovalent, divalent, and/or polyvalent enic radicals each comprising at least one reactive unsaturation that is radiation-curable. As such, all enic compounds are radiation-curable compounds, but radiation-curable compounds may or may not be enic compounds. Non-limiting examples of such enic radicals include olefinic, ethylenic, acetylenic, and allenic radicals, such as methylidene, methylene, ethylidene, vinylidene, vinylene, propylidene, isopropylidene, propylene, allenyl, propenyl, propenylidene, allyl, allylidene, isopropenyl, propenylene, cyclopropenyl, acetonylidene, acryloyl, butylidene, isobutylidene, sec-butylidene, crotyl, isocrotyl, methallyl, isocrotonoyl, crotonoyl, alkylacryloyl (e.g., methacryloyl, ethacryloyl, propylacryloyl, butylacryloyl), cinnamoyl, alkenyl, butenyl, prenyl, isoprenyl, cyclopentenyl, cyclohexenyl, norbornenyl, dicyclopentadienyl, ethenylarylene, amylidene, isopentylidene, isoamylidene, neopentylidene, isopentenyl, senecioyl, isohexylidene, sorboyl, geranyl, neryl, citronellyl, linalyl, farnesyl, oleyl, phytyl, hydnocarpoyl, chaulmoogryl, benzilidene, phthalylidene, isophthalylidene, terephthalylidene, phenethylidene, styryl, styrylidene, cinnamyl, cinnamylidene, cuminylidene, benzhydrylidene, salicylidene, anisylidene, vanillylidene, veratrylidene, phenacylidene, furyl, furfuryl, furfurylidene, vinyl ether, allyl ether, butenyl ether, isoprenyl ether, isopropenyl ether, norbornenyl ether, dicyclopentadienyl ether, ethenylarylene ether, vinyl ester, allyl ester, butenyl ester, isoprenyl ester, isopropenyl ester, norbornenyl ester, dicyclopentadienyl ester, and ethenylarylene ester.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, such as less than 5.

As used herein, the term "percent NCO" or "% NCO" refers to the percent by weight of free, unreacted isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pascal ("Pa") or pounds per square inch ("psi"), is derived in accordance to ASTM D6272-02.

As used herein, the term "water vapor transmission rate" ("WVTR") refers to the mass of water vapor that diffuses into a material of a given thickness per unit area per unit time at a specific temperature and humidity differential. Standard tests for WVTR include ASTM E96-00.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/sec to about 200 ft/sec, and is usually understood to be 125 ft/sec, unless otherwise specified. A golf ball may have different COR values at different initial velocities.

Other than in the operating examples, or unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the crosslink density of the crosslinkable components, i.e., the degree of crosslinking, can range from 5% to 100% of complete crosslinking. In other examples, the crosslink density can range from 35% to 85% of full crosslinking. In other examples, the crosslink density can range from 50% to 85% of full crosslinking. One skilled in the art will understand that the presence and degree of crosslinking, i.e., the crosslink density, can be determined by a variety of methods, such as dynamic mechanical thermal analysis (DMTA) in accordance with ASTM E1640-99.

The present disclosure is directed to a golf ball comprising a core, at least one (e.g., 2, 3, 4 or more) cover layer encasing the core, and at least one coating layer encasing the cover layer, wherein the coating layer is capable of forming covalent crosslinks (e.g., carbon-carbon crosslinks) with one or more immediately adjacent layers (e.g., indicia layer, cover layer, etc.). The coating layer may be formed from at least one reactive composition (e.g., one-part, two-part, thermal-curable, radiation-curable, or a combination thereof) comprising at least one iso(thio)cyanate-reactive chemical (e.g., polyols, polyamines, and/or amino alcohols), and at least one radiation-curable iso(thio)cyanate. The radiation-curable iso(thio)cyanate may comprise at least 5% (e.g., 35%, 50%, or greater, by weight or moles) of the total iso(thio)cyanate used in the reactive composition. The reactive composition, or at least one part thereof, may be substantially free of epoxy groups.

Suitable radiation-curable iso(thio)cyanate (e.g., enic iso(thio)cyanate) may have in each molecule at least one (e.g., 2, 3, 4, or more) reactive carbonaceous bonds (e.g., carbon-carbon double or triple bonds, carbon-heteroatom (e.g., O, N, S, P) single or double bonds), such as enic unsaturations, and at least one (e.g., 2, 3, 4, or more) free reactive and/or blocked (but unblockable) iso(thio)cyanate groups. Such radiation-curable iso(thio)cyanates include, without limitation, vinyl iso(thio)cyanates, allyl iso(thio)cyanates, (thio)urethane adducts of radiation-curable alcohols with polyiso(thio)cyanates, (thio)urea adducts of radiation-curable amines with polyiso(thio)cyanates, (thio)urea adducts of radiation-curable amides with polyiso(thio)cyanates, (meth)acryloyl iso(thio)cyanates (e.g., adduct of (a) at least one (meth)acryloyl alcohol or (meth)acryloyl amine with (b) at least one polyiso(thio)cyanate), chemicals having a structure of $(OCN)_m Z(CR=CR'R'')_n$, structural isomers thereof, stereo isomers thereof, or blends thereof. Suitable iso(thio)cyanate-reactive chemicals include polyester polyols and enic polyols. One or combinations of two or more additives may be mixed into the reactive composition.

The coating layer formed from the reactive composition may be a primer, a base coat, or a top coat, transparent, translucent, colored, or pigmented, and may have one or more properties such as a thickness of 0.0001-0.03 inches, a 20° gloss of at least about 5, a cross hatch adhesion of 90-100%, and/or a pencil hardness of 3B to 6H. One or more indicia layers may adjoin the coating layer. The ink composition that forms the indicia layer may comprise one or more radiation-curable moieties crosslinkable to the radiation-curable iso(thio)cyanate in the coating layer, such as (meth)acryloyl radicals. In one example, the ink composition also comprises at least one radiation-curable iso(thio) cyanate that is the same as or different from the one in the coating layer. In another example, at least one of the adjoining coating and indicia layers comprises at least one radiation-curable iso(thio)cyanate. The coating and indicia layers may be radiation-cured together, resulting in covalent adhesion therebetween through the formation of interfacial crosslinks (e.g., carbon-carbon crosslinks).

The radiation-curable iso(thio)cyanate disclosed herein may be used to form golf balls through a number of different methods. Typically, such methods involve providing a core encased in at least one cover layer, providing a reactive composition that comprises at least one radiation-curable iso(thio)cyanate and at least one polyol or polyamine, forming, about the cover layer, at least one coating layer with at least one indicia layer adjoined thereto, wherein at least one of the coating and indicia layers is formed from the reactive composition, and forming interfacial crosslinks between at least the coating and indicia layers through the radiation-curable group.

The golf ball portion that makes contact with a golf club in play is its outermost surface, which may be formed from a coating layer disposed about the cover of the ball. The coating layer may serve to protect the cover, the identifying indicia, and/or any paint layers underneath, to enhance abrasion and shear resistance of the outermost surface of the ball, and/or to add a pleasing, high gloss appearance to the ball. The coating layer may comprise at least one clear or pigmented primer coat and/or at least one translucent, transparent, clear, or pigmented topcoat, although for certain applications a single topcoat may suffice. The primer coat may be applied to promote adhesion and/or to smooth surface roughness of the cover prior to application of the topcoat(s). Coating compositions may be free of pigmentation or water white, or may contain small amounts of dye, pigment, and/or optical brighteners so long as they still allow for a bright outermost surface. The ink compositions that form one or more identifying indicia layers may be disposed, directly or alternatingly, over the cover, over the primer coat or base coat, between the cover and the primer coat or topcoat, between the primer coat and the topcoat, and/or over the topcoat.

The coating composition of the present disclosure may have a one-part formulation or a two-part formulation. Part I of the two-part formulation comprises at least one radiation-curable iso(thio)cyanate, such as at least two, three, four, or more different radiation-curable iso(thio)cyanates. Suitable radiation-curable iso(thio)cyanates include, without limitation, compounds wherein each molecule has at least one (e.g., at least two, three, four, or more) non-aromatic carbon-carbon unsaturation and at least one (e.g., at least two, three, four, or more) free reactive iso(thio)cyanate group (i.e., —NCO and/or —NCS) and/or at least one (e.g., at least two, three, four, or more) blocked but unblockable iso(thio)cyanate group, such as enic iso(thio)cyanates. Part I may further comprise at least one (e.g., at least two, three, four, or more) non-enic iso(thio)cyanates. The radiation-curable iso(thio)cyanate or blend of two or more radiation-curable iso(thio)cyanates may be present in an amount of at least 5% by weight or moles of all iso(thio)cyanates in Part I, such as at least 10%, 15%, 20%, 25%, 30%, 35%, 40%, 45%, 50%, 60%, 70%, 75%, 80%, 85%, 90%, 95%, or up to 100%, or any ranges therebetween. Part II of the two-part formulation comprises at least one (e.g., at least two, three, four, or more) iso(thio)cyanate-reactive chemical (i.e., chemical having at least one functional group reactive to iso(thio)cyanate group), such as polyahls as disclosed herein. At least one (e.g., at least two, three, four, or more) of the iso(thio)cyanate-reactive chemical(s) may be radiation-curable. Non-limiting suitable radiation-curable iso(thio)cyanate-reactive chemicals include those having one, two, three, or more non-aromatic carbon-carbon unsaturation(s), such as enic polyahls. When incorporated in Part II, the enic polyahl or blend of two or more enic polyahls may be present in an amount of at least 0.1%, such as at least 1%, 5%, 10%, 20%, 30%, or 40%, but not more than 100%, such as not more than 90%, 80%, 70%, 60%, or 50%, by weight or moles of all polyahls in Part II, or any ranges therebetween. Part I and Part II can be mixed at a suitable weight or molar ratio to form the coating layer, such as, without limitation, 10:1 or less, like 5:1, or 1:1.5 or greater, like 2:1 or 1.5:1, or any ranges therebetween.

Suitable radiation-curable iso(thio)cyanates can be partially or fully halogenated or unhalogenated, linear or branched, and/or cyclic, aliphatic, alicyclic, aromatic, or araliphatic, having 2-200 carbon atoms (e.g., 3, 4, 5, 6, 7, 8, 10, 12, 16, 18, 20, 22, 25, 30, 36, 44, and any number ranges therebetween), optionally comprising 1-10 of the same or different substituent groups chosen from $C_1$-$C_{12}$ linear, branched, and/or cyclic alkyl, alkoxy (e.g., methoxy), acetyl, acetoxy, phenyl, halogen, oxo, and keto groups. Suitable radiation-curable iso(thio)cyanates may comprise, in each molecule, 1, 2, 3, 4, or more, such as up to about 10, radiation-curable unsaturations that include, but are not limited to, non-aromatic carbon-carbon unsaturations, such as enic unsaturations of the same or different kinds chosen from ethylenic, acetylenic, and olefinc unsaturations. As such, suitable radiation-curable iso(thio)cyanates may be monoenic, dienic, trienic, or higher polyenic. Suitable radiation-curable iso(thio)cyanates may comprise, in each molecule, 1, 2, 3, 4, or more free reactive and/or blocked but unblockable iso(thio)cyanate group(s), and as such may include, without limitation, moniso(thio)cyanates, diiso(thio)cyanates, triiso(thio)cyanates, and higher polyiso(thio)cyanates.

Non-limiting examples of radiation-curable iso(thio)cyanates include vinyl iso(thio)cyanates, allyl iso(thio)cyanates, (thio)urethane adducts of radiation-curable alcohols (e.g., enic alcohols) with polyiso(thio)cyanates, (thio)urea adducts of radiation-curable amines (e.g., enic amines) with polyiso(thio)cyanates, (thio)urea adducts of radiation-curable amides (e.g., enic amides) with polyiso(thio)cyanates, structural isomers thereof, stereo isomers thereof, others known to one skilled in the art, and blends of two or more thereof.

Suitable radiation-curable alcohols can be partially or fully halogenated or unhalogenated, linear or branched, and/or cyclic, aliphatic, alicyclic, aromatic, or araliphatic, having 2-100 carbon atoms (e.g., 3, 4, 5, 6, 7, 8, 10, 12, 16, 18, 20, 22, 25, 30, 36, 44, and any number ranges therebetween), optionally comprising 1-10 of the same or different substituent groups chosen from $C_1$-$C_{12}$ linear, branched, and/or cyclic alkyl, alkoxy (e.g., methoxy), acetyl, acetoxy, phenyl, halogen, oxo, keto, epoxy, amine, and mercapto groups. Suitable radiation-curable alcohols may comprise, in each molecule, 1, 2, 3, 4, or more, such as up to about 10, radiation-curable unsaturations that include, but are not limited to, non-aromatic carbon-carbon unsaturations, such as enic unsaturations of the same or different kinds chosen from ethylenic, acetylenic, and olefinc unsaturations. As such, suitable radiation-curable alcohols may be monoenic, dienic, trienic, or higher polyenic. Suitable radiation-curable alcohols may comprise, in each molecule, 1, 2, 3, 4, or more hydroxyl groups, and as such may include, without limitation, monols, diol, triols, and higher polyols.

Non-limiting examples of radiation-curable alcohols include alkenols, cycloalkenols, cycloalkenyl alkanols, arylakenols, alkynols, unsaturated fatty alcohols, polyenols, allenic alcohols, acetylenic alcohols, polyacetylenic alcohols, epoxy alcohols, keto alcohols, hydroxyethers, hydroxyesters, hydroxyetheresters, structural isomers thereof, and stereo isomers thereof. Non-limiting examples of enic alcohols include vinyl alcohol, allyl alcohol, methallyl alcohol, dimethylallyl alcohols, crotol, 2-butene-1-ol, 3-buten-1-ol, 3-butene-2-ol, prenol, isopentenol, 1,1-alcohol, 4-penten-1-ol, 3-penten-2-ol, 2-penten-3-ol, 1-penten-3-ol, 2-penten-1-ol, 4-menthyl-3-pentenol, 2-hexen-1-ol, 3-hexen-1-ol, 1-hexen-3-ol, 5-hexen-1-ol, 5-hexen-2-ol, 6-hepten-1-ol, 4-hepten-2-ol, 1-hepten-3-ol, 2-methyl-6-hepten-1-ol, 2,6-dimethyl-6-hepten-1-ol, 2(7)-octen-1-ols, 1-octen-3-ol, citronellol, rhodinol, dihydrolinalool, isoeugenol, 6-nonen-2-ol, 8-nonen-1-ol, 1-nonen-3-ol, 5(9)-decen-1-ols, 10-undecen-1-ol, 2(5,7,8,9,10,11)-dodecen-1-ols, 2(4,9,10, 11, 12)tridecen-1-ols, 5(7,8,9,11,12)-tetradecen-1-ols, 6(8,9, 10,11,14)-pentadecen-1-ols, 6(8,9,10,11)-pentadecen-1-ols, 5(7,9, 11)-hexadece-1-ols, gyptol, glyptol, 7-acetoxy-7-hexadecen-1-ol, 14-methyl-8-hexadecen-1-ol, phytol, 8(10)-heptadecen-1-ols, ocenol, vaccenoyl alcohol, petroselinyl alcohol, petroselaidyl alcohol, 6(13)-octadecen-1-ols, 2-acetylamino-3-octadecen-1-ol, 5-nonadecen-1-ol, 3(9, 10,11,15)-eicosen-1-ols, 9-docosen-1-ol, 9-tetracosen-1-ol, myristoleol, myristelaidyl alcohol, palmitoleyl alcohol, palmitoleidyl alcohol, oleol, gadoleyl alcohol, gadelaidyl alcohol, brassidyl alcohol, gondoyl alcohol, erucyl alcohol, isooleyl alcohol, elaidyl alcohol, nervonoyl alcohol, ricinoleyl alcohol, ricinelaidyl alcohol, 3-trimethylsilylallyl alcohol, pinenol, pinocarveol, piperitol, 1-terpinen-4-ol, 3-terpinen-1-ol, α-terpineol, β-terpineol, dihydrocarveol, isodihydrocarveol, perillyl alcohol, p-2-menthen-1-ol, p-1-menthen-9-ol, dihydromyrcenol, cedrenol, α-eudesmol, β-eudesmol, selinenol, guaiol, spathulenol, macrocarp-11 (15)-en-8-ol, himachalol, widdrol, sesquiterpene alcohols, 7-elemenol, terpineol, myrtenol, sabinol, cardinol, santalol, cubenol, muurolol, zingiberenol, vinylphenols, 2-allylphenol, chavicol, anol, cinnamyl alcohol, amylcinnamyl alcohol, 4-allyloxy-2-hydroxybenzophenone, p-vinylguaiacol, eugenol, 2-allyl-6-methoxyphenol, 4-allylsyringol, 2-butene-1,4-diol, 3-allyloxy-1,2-propanediol, 2-allyldiphenol, linalool oxide, epoxylinalool, nerol, geraniol, isogeraniol, farnesol, geranylgeraniol, geranylfarnesol, 1,5-octadiene-3-ol, 2,6-dimethyl-3,7-octadien-2,6-diol, 2,6-dimethyl-3,7-octadien-1,6-diol, 3,6-nonadiene-1-ol, 2,6-nonadiene-1-ol, p-menthatrienol, carveols, hotrienol, artemisia alcohol, lavandulol, linalools, p-mentha-6,8-dien-2-ol, 3-oxo-α-ionol, cardina-1,4-dien-3-ol, α-bisabolol, levomenol, elemol, nerolidol, zingiberol, bulnesol, polyprenols, bombycol, linoleyl alcohol, linolenyl alcohol, elaidolinoleyl alcohol, elaidolinolenic alcohol, arachidonoyl alcohol, catalpyl alcohol, punicyl alcohol, calendyl alcohol, jacaryl alcohol, parinaryl alcohol, resveratrol, crysanthemol, malvalyl alcohol, sterculyl alcohol, 2-hydroxy-sterculyl alcohol, hydnocarpyl alcohol, chaulmoogryl alcohol, gorlyl alcohol, coniferyl alcohol, curcumin, jasmine alcohol, furfuryl alcohol, maltol, ethyl maltol, umbellulol, pulegol, 5-hydroxypulegone, hydroxypiperitenones, phellandrol, phellandrenol, ipsenol, amitinol, myrtenol, 2,3-dimethyl-5-hexen-2-ol, myrcenol, dihydromyrcenol, nopol, sanderol, methyl eugenol, methyl isoeugenol, propenyl guaethol, sclareol, ocimenol, dihydroocimenol, dihydrolinalool, formyrcenol, ipsdienol, verbenol, carotenoid alcohols, retinol, structural isomers thereof, stereo isomers thereof, blends of two or more thereof, and the likes thereof.

Suitable radiation-curable alcohols also include hydroxyl-containing enic ethers (e.g., mono-ethers, di-ethers, tri-ethers, and higher ethers), such as hydroxyl-containing vinyl ethers, hydroxyl-containing allyl ethers, hydroxyl-containing butenyl ethers, hydroxyl-containing isoprenyl ethers, hydroxyl-containing isopropenyl ethers, hydroxyl-containing norbornenyl ethers, hydroxyl-containing dicyclopentadienyl ethers, hydroxyl-containing ethenylarylene ethers, and the likes thereof. Non-limiting examples include hydroxy(cyclo)alkyl vinyl or allyl ethers in which the (cyclo)alkyl group is linear, branched, or cyclic containing up to 20 carbon atoms (e.g., hydroxyethyl vinyl ether, hydroxypropyl vinyl ether, hydroxybutyl vinyl ether, cyclohexanedimethanol monovinyl ether, 2-hydroxyethyl allyl ether, 2-hydroxyalkyl ally ethers), diethyleneglycol monovinyl ether, (poly)ethylene glycol monoallyl ethers, (poly)propylene glycol monoallyl ethers, trimethylolpropane monoallyl ether, trimethylolpropane diallyl ether, pentaerythritol monoallyl ether, pentaerythritol diallyl ether, pentaerythritol triallyl ether, structural isomers thereof, stereo isomers thereof, blends of two or more thereof, and the likes thereof.

Suitable radiation-curable alcohols also include hydroxyl-containing ester adducts (e.g., monoesters, diesters, triesters, and higher polyesters) of acids (e.g., monoacids, diacids, triacids, and higher polyacids) with alcohols (e.g., monols, diols, triols, tetraols, and higher polyols) or oxides (e.g., alkylene oxides such as ethylene oxide and/or propylene oxide), wherein at least one of the acid and the alcohol (or both) is radiation-curable (e.g., enic). Such hydroxyl-containing radiation-curable ester adducts include, without limitation, adducts of enic acids with polyols, adducts of acids with enic polyols, adducts of enic hydroxy acids with alcohols, and adducts of enic acids (including enic hydroxy acids) with enic alcohols.

Suitable enic acids (e.g., monoacids, diacids, triacids, and higher polyacids) can be carboxylic, sulfonic, phosphoric, or a combination thereof, partially or fully halogenated or unhalogenated, linear or branched, and/or cyclic, aliphatic, alicyclic, aromatic, or aralipathic, having 2-100 carbon atoms (e.g., 3, 4, 5, 6, 7, 8, 10, 12, 16, 18, 20, 22, 25, 30, 36, 44, and any number ranges therebetween), comprising 1, 2, 3, 4, or up to about 10 unsaturations of the same or different kinds chosen from ethylenic, acetylenic, and olefinc unsaturations (e.g., monoenoic, dienoic, or polyenoic), optionally comprising 1-10 of the same or different substituent groups chosen from $C_1$-$C_{12}$ linear, branched, and/or cyclic alkyl, alkoxy (e.g., methoxy), acetyl, acetoxy, phenyl, halogen, hydroxyl, oxo, keto, epoxy, amine, and mercapto groups. Suitable enic acids include, without limitation, alkenoic acids, cycloalkenic acids, cycloalkenyl alkanoic or alkenoic acids, arylakenoic acids, unsaturated fatty acids, monoethenoic acids, polyethenoic acids, methylene-interrupted polyenoic acids, conjugated polyenoic acids, non-methylene-interrupted polyenoic acids, allenic acids, ethynoic acids, acetylenic acids, polyacetylenic acids, epoxy acids, hydroxy acids, keto acids, anhydrides thereof (e.g, alkenyl succinic anhydrides), structural isomers thereof, stereo isomers thereof, estolides thereof, blends of two or more thereof, and the likes thereof.

Non-limiting examples of enic acids include acrylic acid, methacrylic acid, ethacrylic acid, α- and β-propylacrylic acids, n-, sec-, iso-, and tert-butylacrylic acids, 2-ethyl-3- propylacrylic acid, maleic acid, fumaric acid, itaconic acid, propenyl succinic anhydrides, butenoic acids (e.g., crotonic acid, isocrotonic acid, vinylacetic acid), tiglic acid, angelic acid, senecioic acid, citraconic acid, mesaconic acid, 2-vinylpropionic acid, isopropenylacetic acid, 3-hydroxy-2-butenoic acid, 2(3,4)-pentenoic acids (e.g., allylacetic acid), 2(3,4)-methyl-2(3,4)-pentenoic acids, 2,4-dimethyl-2-pentenoic acid, 3,3(2,3)-dimethyl-4-pentenoic acids, 3-isopropenylvaleric acid, 3-isopropenyl-1,5-pentanedioic acid, glutaconic acid, 2,4-pentadienoic acid, 5-cyclohexyl-2-pentenoic acid, protolichesterinic acid, piliformic acid, ricinstearolic acid, 3-hydroxy-4-pentenoic acid, 2(3,4,5)-hexenoic acids, 2(3)-methyl-2(5)-hexenoic acids, 6-acetoxy-4(5)-hexenoic acids, 4-ethyl-2-hexenoic acid, sorbic acid, 4-ethyl-2-hexenoic acid, 6-acetoxy-4(5)-hexenoic acids, 3-hydroxy-4(5)-hexenoic acids, 2(3,4,5,6)-heptenoic acids, 3-methyl-2(3,6)-heptenoic acids, 2,6-dimethyl-5-heptenoic acid, dimethyl-heptadienoic acids, 3-hydroxy-6-heptenoic acid, 2(3,4,5,6,7)-octenoic acids, 4-ethyl-2-octenoic acid, 2,5-dimethyl-5-octenoic acid, citronellic acid, 2,7-dimethyl-7-octenoic acid, 3-hydroxy-6(7)-octenoic acids, 8-hydroxy-5,6-octadienoic acid, neric acid, geranic acid, isogeranic acid, 4-ethyl-2-octenoic acid, 2(3,4,6,8)-nonenoic acids, 6-butyl-7-nonenoic acid, 8-methyl-6-nonenoic acid, 4,8-dimethyl-3,7-nonadienoic acid, 2-heptyl-2-nonenoic acid, 3-hydroxy-8-nonenoic acid, 2(3,4,5,6,9)-decenoic acids (e.g., obtusilic acid, caproleic acid), 9(10)-hydroxy-2-decenoic acids, 3-hydroxy-9-decenoic acid, 9-keto-2-decenoic acid, matricaric acids, stillingic acid, 2-octyl-2-decenoic acid, 3,5-dimethyl-5-decenoic acid, 2(5,7,9,10)-undecenoic acids (e.g., hendecenoic acid), 11-hydroxy-9-undecenoic acid, 3,5-dimethyl-5-undecenoic acid, 3-hydroxy-10-undecenoic acid, 2(3,4,5,6,7,8,9,10,11)-dodecenoic acids (e.g., linderic acid, lauroleic acid), 12-hydroxy-9-dodecenoic acid, 3-methyl- and 3-ethyl-5-dodecenoic acids, 3-hydroxy-6-dodecenoic acid, 2(7,11,12)-tridecenoinc acids, 2-butyl-12-tridecenoic acid, 2(4,5,7,9,11,13)-tetradec acids (e.g., myristoleic acid, myristelaidic acid, physeteric acid, tsuzuic acid), 2-methoxy-6-tetradecenoic acid, 7-methoxy-4-tetradecenoic acid, megatomic acid, tetradecatrienoic acids, 3-hydroxy-5-tetradecenoic acid, 3-hydroxy-5,8-tetradecadienoic acid, 3-hydroxy-5,8,11-tetradecatrienoic acid, 7(9,10,13,14)-pentadecenoic acids, 2-methoxy-6-pentadecenoic acid, 2(3,5,6,7,8,9,10,11,13,14,15)-hexadecenoic acids (e.g., gaidic acid, palmitoleic acid, palmitelaidic acid), 2-methoxy-5(6)-hexadecenoic acids, 9-methyl-10-hexadecenoic acid, 7-methyl-8-hexadecenoic acid, hiragonic acid, hydrosorbic acid, 7,10,13-hexadecatrienoic acid, hexadecatetraenoic acids, 15-methylpalmitoleic acid, 3-hydroxy-4-hexadecenoic acid, 7(8,9,10,11,16)-heptadecenoic acids, 6-methyl-9-heptadecenoic acid, civetic acid, margarolic acid, 2(3,4,5,6,7,8,9,10,11,12,13,14,15,16,17)-octadecenoic acids (e.g., petroselinic acid, petroselaidic acid, petroselidinic acid, oleic acid, elaidic acid, isooleic acid, asclepic acid, vaccenic acid), 17-methyl-6(7)-octadecenoic acids, linoleic acid, linolenic acids, isolinoleic acids, γ-linolenic acid, stearidonic acid, hydroxylinoleic acids, hydroxylinolenic acids, 13-hydroxy-2-octadecenoic acid, ricinelaidic acid, ricinoleic acid, isoricinoleic acid, densipolic acid, dimorphecolic acid, 9,10,13(9,12,13)-trihydroxy-2-octadecenoic acids, coriolic acid, 3-methyl-2,4,6-octatrienoic acid, pseudoeleostearic acid, colneleic acid, colnelenic acid, columbinic acid, linelaidic acid, linolenelaidic acid, kamlolenic acid, Mangold's acid, Mikusch's acid, avenoleic acid, coniferonic acid, ephedrenic acid, 3(5,7,8,9,10,11,18)-nonadecenoic acids, 18-methyl-12-nonadecenoic acid, 7-hexadecenylitaconic acid, 2(3,5,6,9,10,11,13,14,15)-eicosenoic acids (e.g., gadoleic acid, gadelaidic acid, gondoic acid, gondoleic acid, paullinic acid, cetelaidic acid), 2-methyl-2-eicosenoic acid, 13-methyl-14-eicosenoic acid, 5(11,15)-hydroxy-4-eicosenoic acids, lesquerolic acid, auricolic acid, 11,14(11,12)-eicosadienoic acids, stearidonic acid, eicosapentaenoic acid, chrysobalanic acid, dihomo-γ-linolenic acid, juniperonic acid, Mead's acid, podocarpic acid, bishomopinolenic acid, dihomolinoleic acid, keteleeronic acid, 5(9,11,12,13,15)-docosenoic acids (e.g., cetoleic acid, brassidic acid, erucic acid), 13,16-docosadienoic acid, 13,16,19-docosatrienoic acid, docosapentaenoic acids, docosahexaenoic acid, dihomo Mead's acid, traumatic acid, 10(14,22)-tricosenoic acids, 11,14,17(8,11,14)-eicosatrienoic acids, ω-3 arachidonic acid, 9(13,15)-tetracosenoic acid (e.g., nervonic acid), hydroxynervonic acid, 11,13-dihydroxy-9-tetracosenoic acid, 17-methyl-18-tetracosenoic acid, mycolipenic acids, hydroxynervonic acid, selacholeic acid, axillarenic acid, 2,4-dimethyl-2-pentacosenoic acid, 9(15,17,18)-hexacosenoic acids (e.g., ximenic acid), 2-methyl-2-hexacosenoic acid, heptacosenoic acid, 9(23)-octacosenoic acids, nonacosenoic acid, 9(21)-triacontenoic acids (e.g., lumequic acid), limonic acid, norlimonic acid, limononic acid, 7-hydroxy-limononic acid, norlimononic acid, piperic acid, piperinic acid, isopiperinic acid, chavicinic acid, isochavicinic acid, shikimic acid, caffeic acid, ferulic acid, o-, m-, and p-coumaric acids, o-, m-, and p-hydroxycinnamic acids, sinapic acid, atropic acid, umbellic acid, isoferulic acid, betulinic acid, chlorogenic acid, maslinic acid, rosmarinic acid, myrtenic acid, o-, m-, and p-vinylbenzoic acids, o-, m-, and p-allylbenzoic acids, o-, m-, and p-propenylbenzoic acids, cinnamic acid, amylcinnamic acid, o-methoxycinnamic acid, guaiaretic acid, vinyl methoxybenzoic acids, allyl methoxybenzoic acids, allyl dimethoxybenzoic acids, farnesic acid, geranylgeranic acid, geranylfarnesic acid, elemonic acid, abietic acid, licanic acids, chrysanthemic acid, malvalic acid, sterculic acid, 2-hydroxy-sterculic acid, hydnocarpic acid, mamaoic acid, oncobic acid, chaulmoogric acid, gorlic acid, hormelic acid, alepric acid, aleprylic acid, aleprestic acid, alepramic acid, aleprolic acid, chorismic acid, prephenic acid, thujic acid, muconic acid, aconitic acid, penicillic acid, mucobromic acid, mucochloric acid, jasmonic acid, furoic acid, pyromucic acid, dehydromucic acid, furilic acid, umbellulic acid, pulegonic acid, 2-methyl-5-isopropenyl-1-cyclopentanoic acid, furfuric acid, myrtenic acid, licaric acid, ocimic acid, phytenic acid, mycolipenic acid, cyclohexenyl tetradecenoic acids, cyclopentenyl hexadecenoic acid, 2-(2-cyclopent-2-enyl-ethyl)-dodecanoic acid, 2-(3-cyclopentenyl)-undecanoic acid, 2-(3-cyclopentenyl)-dodecanoic acid, 2-(2-propenyl)-tridecanoic acid, 2-(2-propenyl)-tetradecanoic acid, 2-(2-propenyl)-pentadecanoic acid, 13-cyclopent-2-enyltridec-4-enoic acid, acetyl aleuritolic acid, cibaric acid, cilienic acid, 3-hydroxy-3'-oxo-β,ε-caroten-16-oic acid, F6, wyerone acid, 9,10(12,13)-epoxylinoleic acids, 12,13-expoxylinolenic acid, alchomoic acid, coronaric acid, vernolic acid, tariric acid, stearolic acid, 6-nonadecynoic acid, behenolic acid, bolekic acid, agonandric acid, ximenynic acid, ximenynoic acid, crepenynic acid, dehydrocrepenylic acid, exocarpic acid, isanic acid, isanolic acid, nemotinic acid, pyrulic acid, helenynolic acid, sterculynic acid, 6-octadecen-9-ynoic acid, 13-octadecen-11-ynoic acid, 2-octadecen-4-yndioic acid, heisteric acid, 8,10-octadecadien-12-ynoic acid, 13,14-dihydroorophcic acid, 13-octadecen-9,11-diynoic acid, oropheic acid, 5,8,11,14-eicosatetraynoic acid, haliclonyne, decynoic acids, dodecynoic acids, octadecynoic acids, acetylenedicarboxylic acid, adrenic acid, 4,7,10,13,16-docosapentaenoic acid, arachidonic acid, 8,11,14,17-eicosatetraenoic acid, timnodonic acid, clupanodonic acid, cervonic acid, conjugated linoleic acids, rumenic acid, conjugated octadecatrienoic acids, calendic acid, catalpic acid, eleostearic acid, jacaric acid, punicic acid, parinaric acids, stellaheptaenoic acid, retinoic acid, taxolic acid, pinolenic acid, sciadonic acid, dihomotaxoleic acid, 9,15-octadecadienoic acid, 3,9,12-octadecatrienoic acid, demospongic acids, laballenic acid, lamenallenic acid, 2,4,5-tetradecatrienoic acid, 8-hydroxy-5,6-octadienoic acid, structural isomers thereof, stereo isomers thereof, blends of two or more thereof, and the likes thereof.

Suitable polyols can be partially or fully halogenated or unhalogenated, linear or branched, and/or cyclic, aliphatic, alicyclic, aromatic, or araliphatic, having 2-100 carbon atoms (e.g., 3, 4, 5, 6, 7, 8, 10, 12, 16, 18, 20, 22, 25, 30, 36, 44, and any number ranges therebetween), being free of enic unsaturation or comprising 1, 2, 3, 4, or up to about 10 of the same or different ethylenic, acetylenic, and/or olefinc unsaturations (e.g., monoenoic, dienoic, or polyenoic), optionally comprising 1-10 of the same or different substituent groups chosen from $C_1$-$C_{12}$ linear, branched, and/or cyclic alkyl, alkoxy (e.g., methoxy), acetyl, acetoxy, phenyl, halogen, oxo, keto, epoxy, amine, carboxyl, and mercapto groups. Non-limiting polyols include alkanols, cycloalkanols, and arylakanols, fatty alcohols, epoxy alcohols, keto alcohols, enic alcohols, aminoalcohols, hydroxy acids, structural and stereo isomers thereof, and mixtures of two or more thereof, such as those disclosed herein and in the co-owned and co-pending U.S. patent application Ser. Nos. 10/434,739 and 10/859,537, the disclosures of which are incorporated herein by reference in their entirety.

Suitable diols and higher polyols also include those having the structure $Y[Y^1(Y^2)_nOH]_m$, where Y is a polyvalent (e.g., divalent, trivalent, or tetravalent) radical, such as a linear or branched alkylene radical (e.g., a methylene carbon, a methyne carbon, or a tetravalent carbon), $Y^1$ is the same or different divalent radicals, such as alkylene (e.g. —$CH_2$—), oxy, thio, urethane, carboxy, carbonyl, amido, oxyalkylene, thioalkylene, carboxyalkylene and/or amidoalkylene radicals, $Y^2$ is the same or different divalent radicals, such as alkylene, oxyalkylene (e.g., —$OC_2H_4$—, —$OC_3H_6$—), thioalkylene, carboxyalkylene and/or amidoalkylene radicals, n is at least 1, and up to 10, such as 3, 6, and any number therebetween, m is 2, 3, or 4. About 50-90% of the hydroxyl groups in the polyol may be esterified by radiation-curable (e.g., enic) acids (e.g., (meth) acrylic acids) into radiation-curable (e.g., enic) groups (e.g., (meth)acryloyl groups). The remaining hydroxyl groups may react with polyisocyanate to form the radiation-curable (e.g., enic) isocyanate. Other polyols include those having one of the following structures: $HOC_xH_{2x-z-2}(OH)_{z+1}$, $HO[C_nH_{2n-z}(OH)_zO]_pH$, $HOC_yH_{2y-z}(OH)_zZ^1(COC_mH_{2m}O)_pH$, $HO[C_mH_{2m-z}(OH)_zOCOZ^2COO]_pC_mH_{2m-z(OH)z+1}$, $HO[C_nH_{2n-z}(OH)_zS]_{p-1}C_nH_{2n-z}(OH)_{z+1}$, and $HO(C_nH_{2n}O)_qC_6H_4Z^3C_6H_4(OC_nH_{2n})_qOH$, where $Z^1$ is O or NR, $Z^2$ is chosen from $C_6H_4$, $C_mH_{2m}$, and $C_mH_{2m-2}$, $Z^3$ is chosen from O, S, $CR_2$, and $SO_2$, R is the same or different moiety chosen from H and $CH_3$, m is 2-10 (e.g. 3-6), n is 2-20 (e.g. 2-10, 2-4), p is 1-40 (e.g. 2-25, 3-15), q is the same or different number chosen from 0-20, x is 4-20, y is 2-10 (e.g. 2-6), z is 0-4, m-z$\geq$2, n-z$\geq$2, y-z$\geq$2, and x-z$\geq$4.

Non-limiting examples of suitable diols and higher polyols include ethylene glycol, propylene glycol, 1,4-butanediol, 2-ethyl-1,6-hexanediol, 1,10-decanediol, 1,4-bis-hydroxymethylcyclohexane, diethylene glycol, triethylene glycol, polyethylene glycols having molecular weights from 200 to about 1,500; the reaction products of 4,4'-dihydroxydiphenyl ether, 4,4'-dihydroxydiphenyl sulfide, 4,4'-dihydroxy-diphenylmethane, 4,4'-dihydroxy-diphenylpropane or 4,4'-dihydroxydiphenylsulfone with 0 to 40 moles of alkylene oxide; polypropylene glycols, polytetrahydrofuran, polybutylene glycols, thiodiethylene glycol, dithiotriethylene glycol, any of the polyols disclosed herein, structural isomers thereof, stereo isomers thereof, blends of two or more thereof, and the likes thereof.

Suitable acids and hydroxy acids include those disclosed in U.S. patent application Ser. No. 10/859,537, which are entirely incorporated by reference herein. Suitable enic hydroxy acids include those disclosed herein above, and others known to one skilled in the art. Suitable alcohols include diols and higher polyols such as those disclosed herein, and monols which can be partially or fully halogenated or unhalogenated, linear or branched, and/or cyclic, aliphatic, alicyclic, aromatic, or araliphatic, having 2-100 carbon atoms (e.g., 3, 4, 5, 6, 7, 8, 10, 12, 16, 18, 20, 22, 25, 30, 36, 44, and any number ranges therebetween), being free of enic unsaturation or comprising 1, 2, 3, 4, or up to about 10 of the same or different ethylenic, acetylenic, and/or olefinc unsaturations (e.g., monoenoic, dienoic, or polyenoic), optionally comprising 1-10 of the same or different substituent groups chosen from $C_1$-$C_{12}$ linear, branched, and/or cyclic alkyl, alkoxy (e.g., methoxy), acetyl, acetoxy, phenyl, halogen, oxo, keto, epoxy, amine, carboxyl, and mercapto groups. Suitable monols include alkane monols, cycloalkane monols, arylakane monols, fatty monols, epoxy monols, keto monols, enic monols, amino monols, monohydroxy acids, structural isomers thereof, stereo isomers thereof, blends of two or more thereof, and the likes thereof.

Non-limiting examples of the radiation-curable hydroxyesters include hydroxyl-containing (e.g., 2-hydroxyethyl, 2-hydroxypropyl, 3-hydroxypropyl, 2-alkyl(e.g., methyl, ethyl, propyl, isopropyl, n-butyl)-3-hydroxypropyl, 2-hydroxybutyl, 3-hydroxybutyl, 4-hydroxybutyl, 5-hydroxypentyl, 6-hydroxyhexyl, hydroxycyclohexyl, 8-hydroxyoctyl, 12-hydroxydodecanyl, 2-hydroxy-3-chloropropyl, 2-hydroxy-3-acryloxypropyl, 2-hydroxy-3-methacryloxypropyl, bis(hydroxymethyl)cyclohexyl, octahydro-4,7-methano-1H-indene-dimethanol, neopentyl glycol, diethylene glycol, dipropylene glycol, dibutylene glycol, triethylene glycol, tripropylene glycol, polyethylene glycol, polypropolene glycol, poly(oxyethylene-co-oxypropylene) glycol, trimethylolpropane, glycerine, trimethylolethane, pentaerythritol, homopentaerythritol) mono-, di-, or tri-esters (e.g., acrylate, methacrylate, ethacrylate, crotonate, cinnamate, itaconate, mono(meth)acryloyloxyethyl maleate, mono(meth)acryloyloxyethyl succinate, mono(meth)acryloyloxyethyl phthalate, and any enic acids disclosed herein), structural isomers thereof, stereo isomers thereof, blends of two or more thereof, and the likes thereof.

Suitable radiation-curable alcohols further include adduts of alcohols, such as those disclosed herein, with 1, 2, 3, 4, or more of the same or different cyclic ethers and/or cyclic esters, wherein at least one of the alcohol, the cyclic ether, and the cyclic ester is radiation-curable. Suitable cyclic ethers (achiral ones such as tetrahydrofuran and chiral ones such as methyl tetrahydrofuran) and cyclic esters (e.g., caprolactone, N-vinyl caprolatone) include those disclosed in U.S. patent application Ser. Nos. 10/434,739 and 10/859, 537, which are incorporated herein by reference in their entirety, and radiation-curable cyclic ethers and radiation-curable cyclic esters known to one skilled in the art. These adducts may have at least one (e.g., 2, 3, 4, or more) ether and/or ester linkages, a molecular weight of at least 150, such as at least 200, at least 300, or greater, and up to 3,000, such as up to 1,500, up to 700, or less, a viscosity at 25.5° C. of up to about 5,000 cP, such as up to 2,000, up to 1,000, or less, and a glass transition temperature of up to about −20° C., such as up to −30° C., up to −35° C., or less.

Other suitable radiation-curable alcohols include adducts of epoxies and acids, wherein at least one of the epoxy and the acid (or both) comprises at least one (e.g., 2, 3, 4, or more) radiation-curable unsaturation (e.g., enic unsaturation). Suitable radiation-curable epoxies (e.g., enic epoxies) include, without limitation, glycidyl esters of radiation-curable acids (e.g., enic acids like those disclosed herein), such as glycidyl (meth)acrylates and methyl glycidyl (meth)acrylate, glycidyl ethers of radiation-curable alcohols (e.g., enic alcohols like those disclosed herein), such as allyl glycidyl ether, other glycidyl-containing radiation-curable compounds, alicyclic epoxy esters, such as 3,4-epoxycyclohexylmethyl (meth)acrylates, structural isomers thereof, stereo isomers thereof, blends of two or more thereof, and the likes thereof. Non-enic epoxies include, without limitation, glycidyl compounds in general (e.g., glycidyl ethers, glycidyl esters, etc.), such as glycidyl esters of alpha-branched monocarboxylic acids having 5-18 carbon atoms in linear or branched structure per molecule, like versatic acid monoglycidyl esters. Suitable acids in general and enic acids in particular include any one or more of those disclosed herein. In one example, the acids may be fatty acids (including all fatty acids disclosed herein, such as drying and/or semi-drying oil fatty acids), which may be monoacids, diacids, or higher polyacids, and may comprise at least one alkyl and/or alkylene radical having 7 or more carbon atoms, such as oleic acid, linoleic acid, ricinoleic acid, linolenic acid, and/or eleostearic acid. In another example, the epoxy may comprise at least one alkyl and/or alkylene readical having 7 or more carbon atoms.

As disclosed above, the radiation-curable alcohols can be hydroxy (meth)acrylates (i.e., (meth)acryloyl alcohols, compounds having at least one hydroxyl group and at least one (meth)acryloyl group), such as monohydroxy monoester adducts of diols with (meth)acrylic acids, monohydroxy polyester (e.g., diester, triester, tetraester, and the like) adducts of triols and/or higher polyols with (meth)acrylic acids, polyhydroxy monoester adducts of triols and/or higher polyols with (meth)acrylic acids, and polyhydroxy polyester adducts of tetraols and/or higher polyols with (meth)acrylic acids. Blends of two or more different n-hydric alcohols (e.g., triols where n is 3, tetraols where n is 4, and the likes thereof) can be used, such that n stands for an integer or a statistical average of at least 2, such as 3, 4, up to about 10. When the n-hydric alcohols or blends thereof undergo esterification by the (meth)acrylic acids, the molar ratio of (meth)acrylic acids to the n-hydric alcohols can be (n-0.6):1 to (n-2.2):1, such as (n-0.8):1 to (n-1.2):1, or about (n-1):1. Non-limiting examples of monohydroxy or polyhydroxy poly(meth)acryloyl esters include those having a molecular weight of 2,000 or less and at least two (meth)acryloyl groups and one or more hydroxyl groups, such as di(meth)acryloyl, tri(meth)acryloyl, poly(meth)acryloyl, and acryloyl-methacryloyl esters of triols, tetraols, and higher polyols, such as trimethylolpropane, pentaerythritol, glycerine, dipentaerithritol, sorbitol, polyester polyols, poly(meth)acrylate polyols, alkoxylated derivatives thereof, blends thereof, as well as low-molecular-weight alkoxylation products of such alcohols (e.g., ethoxylated trimethylolpropanes, propoxylated trimethylolpropanes, adducts of ethylene oxide to trimethylolpropane having a hydroxyl number of about 550 or less), and blends of at least one n.-hydric alcohol with at least one diol (e.g., ethylene glycol, propylene glycol). The resulting monhydroxy poly(meth)acrylates may have a molecular weight of 116-1,000, such as 116-750 or 116-158.

(Meth)acryloyl alcohols further include adducts of the mono- and/or poly(meth)acryloyl monohydric alcohols, such as those described herein, with cyclic ethers and/or cyclic esters, such as those disclosed herein. Such adducts may have a molecular weight of 230-3,000, such as 244-1, 206 or 344-572. One generic structure of of such adducts is:

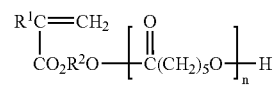

where $R^1$ is H, methyl, ethyl, or linear or branched $C_3$ to $C_6$ alkyl radical, $R^2$ is a divalent organic radical having 1-20 carbon atoms, optionally one or more heteroatoms such as O, N, S, Si, halogen, etc., and n is 1 or greater, such as 2, 3, 4, 5, 6, 7, 8, 9, 10, or greater. In one example, $R^2$ is a linear or branched alkylene radical having 1-12 carbon atoms, such as $—(CH_2)_2—$. These (meth)acryloyl alcohols may have a viscosity at 25.5° C. of about 1,000 cP or less, such as 500, 200, 80, 30, or less, and a glass transition temperature of about −20° C. or less, such as −30° C., −35° C., or less.

(Meth)acryloyl alcohols may also be adducts of (meth)acrylic acid glycidyl esters (e.g., glycidyl acrylate and glycidyl methacrylate) and fatty acids, adducts of (meth)acrylic acids and monoglycidyl compounds, as well as adducts of monoglycidyl compounds and esters (e.g., monoesters, diesters, and higher polyesters) of hydroxyalkyl (meth)acrylates with polycarboxylic acids (e.g., diacids, triacids, and higher polyacids). At least one of the reactants (i.e., the monoglycidyl compound, the polycarboxylic acid, and the hydroxyalkyl (meth)acrylate) that form the adducts may comprise at least one alkyl and/or alkylene readical having 7 or more carbon atoms. Examples of such monoglycidyl compounds include octyl glycidyl ether, dodecyl glycidyl ether, glycidyl oleate, glycidyl linolate, glycidyl eleostearate, glycidyl ricinolate, glycidyl linolenate, versatic acid monoglycidyl ester, and the likes thereof. The resulting (meth)acryloyl alcohol may comprise at least one alkyl and/or alkylene radical having 7 or more carbon atoms.

Suitable polyiso(thio)cyanates that react with the radiation-curable alcohols to form the radiation-curable iso(thio)cyanates may be organic, modified organic, saturated or unsaturated, substituted or unsubstituted, and include aromatic compounds, araliphatic compounds, aliphatic and alicyclic compounds, such as diiso(thio)cyanates and polyiso(thio)cyanates having two or more free reactive and/or blocked but unblockable NCO and/or NCS groups, modified derivatives thereof, dimers thereof, trimers thereof, uretdiones thereof, or iso(thio)cyanurates thereof, structural isomers thereof, stereo isomers thereof, blends thereof, and the likes thereof. The iso(thio)cyanates may also include any iso(thio)cyanate-terminated multimeric adducts, oligomers, polymers, prepolymers, low-free-monomer prepolymers, quasi-prepolymers, and modified polyiso(thio)cyanates derived from the iso(thio)cyanates and polyiso(thio)cyanates above. Low-free-monomer prepolymers refer to prepolymers having free iso(thio)cyanate monomer levels less than about 0.5 weight percent.

In addition to the free reactive and/or blocked but unblockable iso(thio)cyanate groups, the suitable iso(thio)cyanate may further comprise at least one cyclic, aromatic, aliphatic, linear, branched, or substituted hydrocarbon radical R containing 1-20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. Any and all of the iso(thio)cyanates disclosed herein may be used alone or in combination of two or more thereof.

Polyiso(thio)cyanates include diiso(thio)cyanates, dimerized biurets or uretdiones thereof, trimerized iso(thio)cyanurates thereof, and higher polyiso(thio)cyanates such as triiso(thio)cyanates. Exemplary diiso(thio)cyanates include, but are not limited to, aromatic iso(thio)cyanates such as: p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), m-tetramethylxylene diisocyanate ("m-TMXDI"), p-tetramethylxylene diisocyanate ("p-TMXDI"), 1,2-, 1,3-, and 1,4-xylene diisocyanates, 2,2'-, 2,4'-, and 4,4'-biphenylene diisocyanates, 3,3'-dimethyl-4,4'-biphenylene diisocyanate ("TODI"), 2,2'-, 2,4'-, and 4,4'-diphenylmethane diisocyanates ("MDI"), 3,3'-dimethyl-4,4'-diphenylmethane diisocyanate, carbodiimide-modified MDI, polyphenylene polymethylene polyisocyanate ("PMDI," i.e., polymeric MDI), 1,5-naphthalene diisocyanate ("NDI"), 1,5-tetrahydronaphththalene diisocyanate, anthracene diisocyanate, tetracene diisocyanate; and saturated iso(thio)cyanates such as: 1,4-tetramethylene diisocyanate, 1,5-pentamethylene diisocyanate, 2-methyl-1, 5-pentamethylene diisocyanate, 1,6-hexamethylene diisocyanate ("HDI") and isomers thereof, 2,2,4- and 2,4,4-trimethylhexamethylene diisocyanates, 1,7-heptamethylene diisocyanate and isomers thereof, 1,8-octamethylene diisocyanate and isomers thereof, 1,9-novamethylene diisocyanate and isomers thereof, 1,10-decamethylene diisocyanate and isomers thereof, 1,12-dodecane diisocyanate and isomer thereof, 1,3-cyclobutane diisocyanate, 1,2-, 1,3-, and 1,4-cyclohexane diisocyanates, 2,4- and 2,6-methylcyclohexane diisocyanates ("HTDI"), isophorone diisocyanate ("IPDI"), isocyanatomethylcyclohexane isocyanate, isocyanatoethylcyclohexane isocyanate, bis(isocyanatomethyl)cyclohexane (i.e., 1,4-cyclohexane-bis(methylene isocyanate)), 4,4'-dicyclohexylmethane diisocyanate ("H$_{12}$MDI," i.e., bis(4-isocyanatocyclohexyl)-methane), 2,4'- and 4,4'-dicyclohexane diisocyanates, 2,4'- and 4,4'-bis(isocyanatomethyl) dicyclohexanes. Dimerized biurets or uretdiones of diiso(thio)cyanates and polyiso(thio)cyanates include, for example, aromatic iso(thio)cyanates such as uretdiones of toluene diisocyanates, uretdiones of diphenylmethane diisocyanates; and saturated iso(thio)cyanates such as biurets or uretdiones of hexamethylene diisocyanates. Trimerized iso(thio)cyanurates of diiso(thio)cyanates and polyiso(thio)cyanates include, for example, aromatic iso(thio)cyanates such as trimers of diphenylmethane diisocyanate, trimers of tetramethylxylene diisocyanate, isocyanurates of toluene diisocyanates; and saturated iso(thio)cyanates such as isocyanurates of isophorone diisocyanate, isocyanurates of hexamethylene diisocyanate, isocyanurates of trimethyl-hexamethylene diisocyanates. Monomeric triiso(thio)cyanates include, for example, aromatic iso(thio)cyanates such as 2,4,4'-diphenylene triisocyanate, 2,4,4'-diphenylmethane triisocyanate, 4,4',4"-triphenylmethane triisocyanate; and saturated iso(thio)cyanates such as 1,3,5-cyclohexane triisocyanate.

Iso(thio)cyanate-terminated oligomers or polymers include any oligomers, polymers, prepolymers, or quasi-prepolymers having at least two free reactive iso(thio) cyanate groups as terminal groups, and optionally more pendant iso(thio)cyanate groups, on the oligomeric or polymeric backbones. Iso(thio)cyanate-terminated prepolymers and quasi-prepolymers are well known to the skilled artisan, and include, but are not limited to, the reaction products of any one or combination of two or more of the iso(thio) cyanates disclosed herein and any one or combination of two or more of the polyahls disclosed herein.

Saturated iso(thio)cyanates may be suitable when a high level of light stability is desirable in the compositions of the present disclosure. Biurets and iso(thio)cyanurate trimers of saturated diisocyanates may at least in part enhance adhesion and abrasion resistance of the material formed from the compositions. Other relatively light-stable iso(thio)cyanates include certain aromatic iso(thio)cyanates, such as araliphatic iso(thio)cyanates, including 1,2-, 1,3-, and 1,4-xylene diisocyanates, m-tetramethylxylene diisocyanate, p-tetramethylxylene diisocyanate, uretdiones of toluene diisocyanates, isocyanurates of toluene diisocyanates, and isocyanurates of diphenylmethane diisocyanates.

Radiation curable iso(thio)cyanates may further include (thio)urea adducts of radiation-curable amines and/or radiation-curable amides with polyiso(thio)cyanates. Radiation-curable amines (e.g., monoamines, diamines, triamines, and higher polyamines) include, without limitation, those having the same molecular structure as the radiation-curable alcohols disclosed herein, except that one or more of the hydroxyl groups in the alcohols is/are replaced by primary and/or secondary amine group —NHR, where R is chosen from H and linear, branched, or cyclic hydrocarbon group having 1-20 carbon atoms. Non-limiting examples of radiation-curable amines include (meth)acryloyl amines, which may be derived from the (meth)acryloyl alcohols, such as those disclosed herein, through, for example, amination reactions as disclosed herein. Other suitable radiation-curable amines include ester adducts of radiation-curable acids with cyclic amides, ester adducts of radiation-curable alcohols with cyclic amides, and radiation-curable amines with cyclic amides. Examples of cyclic amides (e.g., caprolactam, N-vinyl caprolactam) and other chemicals are disclosed herein and in the co-owned and co-pending U.S. patent application Ser. No. 10/859,537, the disclosure of which is incorporated by reference in its entirety.

Radiation-curable amides include, without limitation, those having the same molecular structure as the radiation-curable alcohols disclosed herein, except that one or more of the hydroxyl groups in the alcohols is/are replaced by amide group —CONH$_2$. Non-limiting examples of radiation-curable amides include (meth)acrylamides, N-methylol (meth) acrylamides, and like amide compounds. Other suitable radiation-curable amides include adducts of radiation-curable amides with cyclic amides.

(Thio)urethane adducts and (thio)urea adducts disclosed herein are suitable radiation-curable iso(thio)cyanates (i.e, molecules comprising both radiation-curable functionality and iso(thio)cyanate group) for the compositions of the present disclosure. One general structure for some of these (thio)urethane adducts, (thio)urea adducts, and other suitable radiation-curable iso(thio)cyanates, is $(OCN)_mZ(CR=CR'R")_n$, where Z comprise one or more hydrocarbon moieties and, optionally, at least one (thio)urethane linkage, (thio)urea linkage, ether linkage, amide linkage, and/or ester linkage, possible as a result of a condensation or addition reaction, the substructure CR=CR'R" is the same or different radical, independently chosen from substituted or unsubstituted cyclic structures (e.g., cycloalkenyl radicals) and linear or branched structures where R, R', and R" are the same or different radicals independently chosen from H, linear or branched $C_1$ to $C_6$ or $C_1$-$C_{30}$ alkyl, $C_3$-$C_{20}$ cycloalkyl or cycloalkenyl, and $C_6$-$C_{30}$ aryl or aralkyl groups, m is at least 1, such as 2, 3, 4, 5, 6, or greater, n is at least 1, such as 2, 3, 4, 5, 6, or greater. In one example, the general structure represents (meth)acrylic iso(thio)cyanates that are (thio)urethane adducts of at least one (meth)acrylic alcohol with at least one polyiso(thio)cyanate, the formation processes of which are described, for example, in U.S. Pat. Nos. 3,782,961, 4,173,682, and 4,225,695, the entire disclosures of which are incorporated by reference herein. The molar ratio of iso(thio)cyanate groups in the polyiso(thio)cyanates to the hydroxyl and/or amine groups in the radiation-curable active-hydrogen-containing compounds (e.g, radiation-curable alcohols, radiation-curable amines, radiation-curable amides, and the likes thereof) can be 1:0.2 to 1:0.8, such as 1:0.3 to 1:0.6 or 1:0.4 to 1:0.5. Weight ratio of the polyiso(thio)cyanate to the polyol and/or polyamine can be 1:1 to 200:1, such as 2:1 to 100:1, or 5:1 to 20:1. Formation of these radiation-curable iso(thio)cyanates can be moderated in a known manner by means of suitable catalysts, such as tin octoate, dibutyltin dilaurate ("DBTL") or tertiary amines such as triethylene diamine. The resultant radiation-curable iso(thio)cyanates can be stabilized against premature polymerization, for example by adding suitable inhibitors and/or antioxidants, including phenols, cresols, hydroquinones, p-benzoquinones, phenothiazines, and quinones such as 2,5-di-tert-butylquinone, in amounts of 0.001-0.3% by weight, or 0.01-5% by weight.

Intermediate adducts of polyols/water and polyiso(thio)cyanates may be used to react with radiation-curable alcohols to form the radiation-curable iso(thio)cyanates. Non-limiting examples of such urethane adducts include the 1:1.5 molar ratio adduct of the 1:3 molar ratio intermediate adduct of trimethylol propane and toluene diisocyanate with hydroxybutyl acrylate, the 1:1.5 molar ratio adduct of the 1:3 molar ratio intermediate adduct of trimethylol propane and toluene diisocyanate with pentaerythritol triacrylate, the 1:1.5 molar ratio adduct of the 3:1 molar ratio intermediate adduct of hexamethylene diisocyanate and water with hydroxybutyl acrylate, the 1:1.5 molar ratio adduct of the 3:1 molar ratio intermediate adduct of hexamethylene diisocyanate and water with pentaerythritol triacrylate.

Iso(thio)cyanate-reactive chemicals suitable for the compositions of the present disclosure include, but are not limited to, polyahls (e.g., polyols, polyamines, amino alcohols) such as those disclosed in the co-owned and co-pending U.S. patent application Ser. Nos. 10/434,739 and 10/859,537, the entire disclosures of which are incorporated herein by express reference thereto. Suitable polyahls for Part II of the formulation may be organic, modified organic, saturated, aliphatic, alicyclic, unsaturated, araliphatic, aromatic, substituted, or unsubstituted. The polyahl may comprise at least one cyclic, aromatic, aliphatic, linear, branched, and/or substituted hydrocarbon moiety containing 1-20 carbon atoms, such as alkyl, alkylene, cycloalkyl, cycloalkylene, aryl, arylene, aralkyl, and/or aralkylene moieties. When multiple cyclic or aromatic moieties are present, linear, branched or substituted hydrocarbons containing 1-10 carbon atoms can be present as spacers between such cyclic or aromatic moieties. The cyclic and/or aromatic moieties may be independently substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, and combinations of two or more groups thereof. The iso(thio)cyanate-reactive hydroxy and/or amine groups may be terminal or pendant groups on the oligomeric or polymeric backbone, and in the case of secondary amine groups, may even be embedded within the backbone. Any and all of the polyahls disclosed herein may be used alone or in combination of two or more thereof.

Polyols can be obtained, for example, by esterifying di- and/or triols, for example neopentyl glycol or trimethylolpropane with di-, tri- or tetracarboxylic acids or their anhydrides, such as, adipic acid, maleic acid or fumaric acid. Suitable hydroxy-functional copolymers are prepared from (meth)acrylic esters, hydroxyalkyl(meth)acrylate esters and, optionally, styrene and/or other monomers such as acrylonitrile. Suitable polyether polyols include those obtained by alkoxylating diols or polyols, and others disclosed herein. Polyol oligomers and polyol polymers further include those containing one or more (thio)urethane and/or (thio)urea linkages, such as polyether polyols, polyester polyols, and polyacrylate polyols extended with diiso(thio)cyanates (such as those disclosed herein, like dicyclohexylmethane diisocyanate). Non-limiting examples of polyether/polyester/polyacrylate polyols include those available from Bayer, under the tradename Desmophen®.

Polyols may have a molecular weight of 50 to 50,000 and include, but are not limited to: polyether polyols such as PTMEG, modified PTMEG, poly(oxyethylene) glycol, poly(oxypropylene) glycol, poly(oxyethylene-oxypropylene) glycol, (ethylene oxide)-capped poly(oxypropylene) ether glycol; polyester polyols such as poly(ethylene adipate) glycol, poly(butylene adipate) glycol, poly(hexamethylene adipate) glycol, poly(ethylene propylene adipate) glycol, poly(ethylene butylene adipate) glycol, poly(hexamethylene butylene adipate) glycol, (o-phthalate-1,6-hexanediol)-based polyester polyol, poly(ethylene terephthalate)-based polyester polyol; polycaprolactone polyols such as (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone; polycarbonate polyols such as poly(phthalate carbonate) glycol, poly(hexamethylene carbonate) glycol, (bisphenol A)-based polycarbonate glycols; polyhydrocarbon polyols such as polyisoprene polyol, poly(hydrogenated isoprene) polyol, hydroxy-terminated liquid isoprene rubber, polybutadiene polyol, poly(hydrogenated butadiene) polyol (like Polytail H and Polytail HA from Mitsubishi Kasei Corp.), poly(ethylene-co-propylene) polyol, poly(ethylene-co-butylene) polyol, poly(alkylene-co-styrene) polyol, Kraton® polyols, glycerine-based polyols, (castor oil)-based polyols; polyols converted from acid functional oligomers or polymers (or ionomers thereof derived from partial or full neutralization with organic or inorganic cations), such as dimerate or trimerate polyols of fatty acids or isostearic acid; and other polyols such as polyolefin polyols and polyamide polyols.

Saturated polyols (aliphatic, alicyclic, or fully hydrogenated) are suitable for use in the present disclosure, because they afford superior light stability when incorporated into the golf ball coating composition. Other examples of polyols include acrylic polyols, polyamide polyols, amino alcohols, short oil alkyds, epoxy resins with secondary hydroxy groups, phenolic resins, and polyvinyl polyols. Vinyl resins may be used to promote adhesion. Polymer precursors include radiation-curable monomers, oligomers, and polymers, such as acrylates, methacrylates, and combinations of two or more thereof.

Suitable polyamines may have a molecular weight of 50 to 50,000, such as 1,000 or greater, and at least two primary or secondary amine terminal groups per molecule. Exemplary polyamines include, but are not limited to: polyether polyamines such as polyoxyalkylene diamines, polyoxyethylene diamines, polyoxypropylene diamines, poly(oxyethylene-oxypropylene) diamines, polyoxypropylene triamine, poly(tetramethylene ether) diamines, (ethylene oxide)-capped polyoxypropylene ether diamines, poly(triethyleneglycol) diamines, poly(trimethylolpropane) triamines, polyethyleneglycol-di(p-aminobenzoate), polytetramethyleneoxide-di(p-aminobenzoate), glycerin-based triamines; and other polyamines such as polyester polyamines, polycaprolactone polyamines, polycarbonate polyamines, polyhydrocarbon polyamines, polyamines converted from acid functional oligomers or polymers or ionomers thereof, polyolefin polyamines, and polyamide polyamines. Any of these polyamines may be prepared from the above-listed polyols through reductive amination of polyether polyols with ammonia and hydrogen in the presence of a catalyst, hydrogenation of cyanoethylated polyols, amination of polyol/sulfonic acid esters, reacting polyols with epichlorohydrin and a primary amine, or any other methods known to the skilled artisan.

Exemplary polyamines converted from the polyols above include, without limitation, polytetramethylene ether diamine, modified polytetramethylene ether diamine, poly (tetrahydrofuran-co-methyltetrahydrofuran) ether diamine, poly(oxyethylene) diamine, poly(oxypropylene) ether diamine or triamine, poly(oxyethylene-oxypropylene) diamine, (ethylene oxide)-capped poly(oxypropylene) diamine, poly(ethylene adipate) diamine, poly(butylene adipate) diamine, poly(hexamethylene adipate) diamine, poly (ethylene propylene adipate) diamine, poly(ethylene butylene adipate) diamine, poly(hexamethylene butylene adipate) diamine, (o-phthalate-1,6-hexanediol)-based polyester polyamine, poly(ethylene terephthalate)-based polyester polyamine, (alkylene oxide)-initiated polycaprolactone polyamine, (ethylene glycol)-initiated polycaprolactone polyamine, (diethylene glycol)-initiated polycaprolactone polyamine, (propylene glycol)-initiated polycaprolactone polyamine, (dipropylene glycol)-initiated polycaprolactone polyamine, 1,4-butanediol-initiated polycaprolactone polyamine, trimethylolpropane-initiated polycaprolactone polyamine, (neopentyl glycol)-initiated polycaprolactone polyamine, 1,6-hexanediol-initiated polycaprolactone polyamine, (polytetramethylene ether glycol)-initiated polycaprolactone polyamine, poly(phthalate carbonate) diamine, poly(hexamethylene carbonate) diamine, (bisphenol A)-based polycarbonate diamines, polyisoprene polyamine, poly(hydrogenated isoprene) polyamine, amine-terminated liquid isoprene rubber, polybutadiene polyamine, poly(hydrogenated butadiene) polyamine, poly(ethylene-co-propylene) polyamine, poly(ethylene-co-butylene) polyamine, poly(alkylene-co-styrene) polyamine, glycerine-based polyamines, (castor oil)-based polyamines, dimerate or trimerate polyamines of fatty acids or isostearic acid, or acid functional polyamines. Saturated (aliphatic, alicyclic, or fully hydrogenated) polyamines are suitable for use in golf balls to provide superior light stability, and include polyoxyalkylene diamines, polyoxyethylene diamines, polyoxypropylene diamines, poly(oxyethylene-oxypropylene) diamines, polyoxypropylene triamines, poly(tetramethylene ether) diamines, (ethylene oxide)-capped polyoxypropylene ether diamines, poly(triethyleneglycol) diamines, poly(trimethylolpropane) triamines, saturated glycerin-based triamines, saturated polyester polyamines, saturated polycaprolactone polyamines, saturated polycarbonate polyamines, saturated polyhydrocarbon polyamines, saturated acid functional polyamines, saturated polyolefin polyamines, and saturated polyamide polyamines.

Other suitable polyols include, but are not limited to, unsaturated diols such as 1,3-bis(2-hydroxyethoxy) benzene, 1,3-bis[2-(2-hydroxyethoxy)ethoxy] benzene, N,N-bis (β-hydroxypropyl)aniline, 1,3-bis {2-[2-(2-hydroxyethoxy) ethoxy]ethoxy} benzene, hydroquinone-di(β-hydroxyethyl) ether, resorcinol-di(β-hydroxyethyl)ether; saturated diols such as ethylene glycol, diethylene glycol, polyethylene glycol, propylene glycol, dipropylene glycol, polypropylene glycol, 2-methyl-1,3-propanediol, 1,2-, 1,3-, 1,4-, or 2,3-butanediols, 2-methyl-1,4-butanediol, 2,3-dimethyl-2,3-butanediol, 1,5-pentanediol, 1,6-hexanediol, dimethylolcyclohexane, 1,3-bis(2-hydroxyethoxy)cyclohexane, 1,3-bis[2-(2-hydroxyethoxy)ethoxy]cyclohexane, 1,3-bis{2-[2-(2-hydroxyethoxy)ethoxy]ethoxy}cyclohexane; unsaturated triols such as castor oil (i.e., triricinoleoyl glycerine); saturated triols such as 1,2,4-butanetriol, 1,2,6-hexanetriol, trimethylolethane (i.e., 1,1,1-tri(hydroxymethyl) ethane), trimethylolpropane (i.e., 2,2-di(hydroxymethyl)-1-butanol), triethanolamine, triisopropanolamine; unsaturated tetraols such as 2,4,6-tris(N-methyl-N-hydroxymethyl-aminomethyl)phenol; saturated tetraols such as pentaerythritol (i.e., tetramethylolmethane), tetrahydroxypropylene ethylenediamine (i.e., N,N,N',N'-tetrakis(2-hydroxypropyl)-ethylenediamine); and other monomeric polyols such as mannitol (i.e., 1,2,3,4,5,6-hexanehexol) and sorbitol (an enantiomer of mannitol) (both saturated).

Other suitable polyamines include, but are not limited to, unsaturated diamines such as m-phenylenediamine, p-phenylenediamine, 1,2- or 1,4-bis(sec-butylamino)-benzene, 3,5-diethyl-(2,4 or 2,6)-toluenediamine, 3,5-dimethylthio-(2,4 or 2,6)-toluenediamine, 3,5-diethylthio-(2,4 or 2,6)-toluenediamine, 4,4'-diamino-diphenylmethane (i.e., 4,4'-methylene-dianiline or "MDA"), 3,3'-dimethyl-4,4'-diamino-diphenylmethane, 3,3'-diethyl-5,5'-dimethyl-4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3'-diethyl-5,5'-dichloro-4,4'-diamino-diphenylmethane, 3,3',5,5'-tetraethyl-4,4'-diamino-diphenylmethane (i.e., 4,4'-methylene-bis(2,6-diethylaniline) or "MDEA"), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di (p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di (aminopropyl)ether), 4,7,10-trioxatridecane-1,13-diamine, polyoxyethylene diamines, polyoxypropylene diamines, poly(oxyethylene-oxypropylene) diamines, (ethylene oxide)-capped polyoxypropylene ether diamines, polytetramethylene ether diamines, 1-methyl-2,6-diamino-cyclohexane, 1,4-diamino-cyclohexane, 1,3- or 1,4-bis(methylamino)-cyclohexane, isophorone diamine, 1,2- or 1,4-bis (sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, 3,3'-diethyl-5,5'-dimethyl-4, 4'-diamino-dicyclohexylmethane, 3,3'-diethyl-5,5'-dichloro-4,4'-diamino-dicyclohexylmethane, 3,3',5,5'-tetraethyl-4,4'-diamino-dicyclohexylmethane (i.e., 4,4'-methylene-bis(2,6-diethylaminocyclohexane)), 2,2'-dichloro-3,3',5,5'-tetraethyl-4,4'-diamino-dicyclohexylmethane, 3,3'-dichloro-4,4'-diamino-dicyclohexylmethane, 3,3'-dichloro-2,2',6,6'-tetraethyl-4,4'-diamino-dicyclohexylmethane, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), trimethylolpropane-based triamines, glycerin-based triamines, N-(2-aminoethyl)-1,3-propylenediamine (i.e., $N_3$-amine) (all saturated); tetramines such as triethylene tetramine, N,N'-bis(3-aminopropyl)ethylenediamine (i.e., $N_4$-amine) (both saturated); and other polyamines such as tetraethylene pentamine (also saturated).

Suitable amino alcohols may be monomeric, oligomeric, or polymeric, having at least one free reactive hydroxy group and at least one free reactive amine group. The hydroxy and amine groups may be terminal or pendant groups on the oligomeric or polymeric backbone, and in the case of secondary amine groups, may even be embedded within the backbone. Non-limiting examples of monomeric amino alcohol curatives include monoethanolamine (saturated), monoisopropanolamine (saturated), diethanolamine (saturated), diisopropanolamine (saturated), and 2-propanol-1,1'-phenylaminobis (unsaturated).

Iso(thio)cyanate-reactive chemicals may additionally contain one or more radiation-curable unsaturations, such as enic unsaturations. Such enic unsaturations may be present in the form of, for example, pedent or terminal esters of enic acids (e.g., (meth)acrylic acids) on the telechelic molecule. Such telechelics can be obtained, for example, by preparing hydroxy-functional copolymers, such as polyacrylates, using epoxide-bearing monomers. The epoxide groups are reacted in a further step with (meth)acrylic acid. Also, polyester acrylates or polyether acrylates may be used, provided they have free active hydrogen groups.

Coating compositions of the present disclosure comprises one or more of the radiation-curable iso(thio)cyanates in the form of reactive monomers, oligomers, and/or polymers as described herein. Weight percentage of the radiation-curable iso(thio)cyanate may range from 1% to 50% or greater of the total coating composition. Combinations of mono- and multi-functional monomers and/or oligomers are desirable for highly crosslinked coatings. Besides the initiators for the polymerization reaction, the coating compositions may further incorporate additional reactive and/or non-reactive additives known to one of ordinary skill in the art as being useful in other golf ball portions, such as the cover, the core, and the intermediate layer(s).

Suitable free-radical initiator may be used to facilitate the curing process. The initiator may be a compound or a mixture of compounds, including thermal initiators and photoinitiators. Thermal initiators may be organic peroxides, elemental sulfur, and/or azo compounds, such as di(t-amyl) peroxide, di(t-butyl) peroxide, dicumyl peroxide, lauryl peroxide, benzoyl peroxide, di(2-t-butylperoxy-isopropyl)-benzene peroxide, 1,1-bis(t-butylperoxy)-3,3,5-trimethylcyclohexane, 2,5-di(t-butylperoxy)-2,5-dimethylhexane, n-butyl-4,4-bis(t-butylperoxy)valerate, t-butyl hydroperoxide, and the like. Photoinitiators include ultraviolet ("UV") photoinitiators such as benzoins, benzoin ethers (e.g., benzoin butyl ether), butyroins, anthraquinones, benzil ketals, α-dialkoxy-acetophenones (e.g., diethoxyacetonephenone), α-hydroxy-alkylphenones, acylphosphine oxides, benzimidazoles, aromatic sulfonyl chlorides, camphorquinone, zanthones, anthraquinones, fluorenones, benzophenones/amines, and thioxanthones/amines, visible-light photoinitiators such as titanocenes, α-diketones, 5,7-diiodo-3-butoxy-6-fluorone, and those disclosed in U.S. Pat. Nos. 5,395,862 and 5,451,343, coinitiators such as tetramethylammonium triphenylbutyl borate, and combinations of two or more thereof. The compound-based initiators may be present in an amount greater than about 0.1 parts per hundred of the total resin, such as 0.1-20 parts or 0.2-10 parts. The initiator may also be one or more energy means, such as heating, electron beam irradiation, x-ray irradiation, γ-ray irradiation, UV light irradiation, visible light irradiation, infrared light irradiation, microwave irradiation, radio wave irradiation, and/or any other high-energy radiation sources capable of generating reactive free radicals. Curing and subsequent formation of the coating is further facilitated by evaporation of the solvent(s) and/or addition of a hardener.

UV absorbers, hindered amine light stabilizers, antioxidants, and/or optical brighteners can be used alone or in combination of two or more thereof, in an amount of less than about 5% by weight, to improve light stability and enhance aesthetic appeal. To prevent significant yellowing from unsaturated components contained in the coating composition and cover surface fractures due to photo-degradation, thereby achieving weathering resistance of the cured coating layer, one or more UV absorbers having an absorption range up to 390 nm max. and/or light stabilizers, such as hindered amine light stabilizers (HALS) may be added to the coating composition, optionally mixed into Part II of the two-part formulation. The UV absorbers can be added in amounts of 0.5 to 3.5% by weight of the solid binder. The HALS stabilizers can be added in amounts of 0.5 to 2.5% by weight of the solid binder.

Suitable UV absorbers include the triphenyltriazines, for example Tinuvin 400 (Ciba) or the oxalic acid dianilides, for example Sanduvor 3206 (Clariant), as well as Uvinul® DS49 (disodium 2,2'-dihydroxy-4,4'-dimethyoxy-5,5'-disulfobenzophenone) and Uvinul® DS50 (2,2', 4,4'-tetrahydroxy-benzophenone), by BASF Corporation; Tinuvin® 328 (2-(2'-hydroxy-3',5'-di(t-amylphenyl)benzotriazole), Tinuvin® 571 (2-(2H-benzotriazol-2-yl)-6-dodecyl-4-methylphenol), Tinuvin® P (2-(2-hydroxy-5-methylphenyl)benzotriazole), and CGL 1545 (experimental triazine derivative) by Ciba Specialty Chemicals Corporation; Sanduvor® PR-25 (dimethyl-4-methoxy-benzylidenemalonate) by Clariant Corporation; Cyasorb® UV-2337 (2-(2'-hydroxy-3',5'-di(t-amylphenyl)benzotriazole), Cyasorb® UV-1164 (2-(4,6-bis(2,4-dimethylphenyl)-1,3,5-triazin-2-yl)-5-octyloxyphenol), and Cyasorb® UV-3638 (2,2'-(1,4-phenylene)-bis(4-3,1-benzoxazin-4-one)) by Cytec Industries; Quercetin® (3,3',4',5,7-pentahydroxy flavone) by EM Industries; UV-Chek® AM-300 (2-hydroxy-4-n-octyloxy-benzophenone) and UV-Chek® AM-340 (2,4-di(t-butylphenyl)-3,5-di(t-butyl)-4-hydroxybenzoate) by Ferro Corporation; Maxgard® DPA-8 (2-ethylhexyl-2-cyano-3,3-diphenylacrylate) by Garrison Industries; Givsorb® 2 (propanedione), Givsorb® 13, Givsorb® 14, and Givsorb®M 15 by Givaudan-Roure Corporation; Norbloc® 6000 (2-(2'-hydroxy-5'-(2-hydroxyethyl)benzotriazole) and Norbloc® 7966 (2-(2'-hydroxy-5'-methacryloxyethylphenyl)-2H-benzotriazole) by Jessen Pharmaceuticals. Suitable light stabilizers include, but are not limited to, Tinuvin® 123, 292, 622LD (dimethyl succinate polymer with 4-hydroxy-2,2,6,6-tetramethyl-1-piperidine ethanol) and Tinuvin® 765 (bis(1,2,2,6,6-pentamethyl-4-piperidinyl)sebacate) by Ciba Specialty Chemicals Corporation; Sanduvor® 3058 and 3070 (hindered amine) by Clariant Corporation; Cyasorb® UV-3581 (3-dodecyl-1-(2,2,6,6-tetramethyl-4-piperidylpyrrolidin-2,5-dione) by Cytec Industries. For aromatic and unsaturated formulations, the UV absorber can be Tinuvin® 328, and the hindered amine light stabilizer can be Tinuvin® 765. Light stabilizer for saturated formulations can be Tinuvin® 292. In addition, Tinuvin® 213 and 770, and antioxidants to prevent degradation of the cover composition, such as Irganox® 1010 (tetrakis(3,5-di(t-butyl-hydroxyhydrocinnamate)) methane) and Irganox® 1135 ($C_{7-9}$-branched alkyl ester of 3,5-di(t-butyl-4-hydroxyhydrocinnamic acid) by Ciba Specialty Chemicals Corporation and Sandostab® P-EPQ (aryl phosphonite) by Clariant Corporation, are also applicable.

To improve uniformity, abrasion resistance, weatherability, and/or other properties of the coating layer, one or more fillers may be selectively blended into the coating composition. As used herein, the term "filler" refers to any material or composition that can be used to manipulate one or more properties of a golf ball portion, such as density or specific gravity, flexural modulus, tensile modulus, strength, moment of inertia, hardness, abrasion resistance, weatherability, volume, weight, etc. The fillers may be powders, fibers, filaments, flakes, whiskers, wires, tubes, spheres, and/or other fine particulates for homogenous dispersion, and may be of nano-scale (i.e., having a particle size of 0.1-100 nm, such as 1 nm, 10 nm, 50 nm, 60 nm, or any ranges therebetween) and/or micro-scale (i.e., having a particle size of greater than 0.1 μm and up to about 100 μm, such as 1 μm, 10 μm, 50 μm, or any ranges therebetween). Suitable fillers include, for example, metal (or metal alloy) powder, metal oxide and salts, ceramics, particulates, carbonaceous materials, siliceous materials, polymeric materials, glass microspheres, and the like or blends thereof.

Non-limiting examples of metal (or metal alloy) powders include, but are not limited to, bismuth, brass, bronze, cobalt, copper, inconel, iron, molybdenum, nickel, stainless steel, titanium, aluminum, tungsten, beryllium, zinc, magnesium, manganese, and tin. Non-limiting examples of metal oxides and salts include, but are not limited to, zinc oxide, iron oxide, aluminum oxide, titanium dioxide, magnesium oxide, zirconium oxide, tungsten trioxide, zirconium oxide, tungsten carbide, tungsten oxide, tin oxide, zinc sulfide, zinc sulfate, zinc carbonate, barium sulfate, barium carbonate, calcium carbonate, calcium metasilicate, magnesium carbonate, and silicates. Non-limiting examples of carbonaceous materials include graphite and carbon black. Examples of other useful fillers include precipitated hydrated silica, boron, clay, talc, glass fibers, aramid fibers, mica, diatomaceous earth, regrind (typically recycled core material mixed and ground to 30 mesh particle size). Examples of polymeric materials include, but are not limited to, hollow spheres or microspheres of chemically or physically foamed thermoplastic or thermosetting polymers, such as urethanes, polyesters, nucleated reaction injection molded polyurethanes or polyureas.

Fillers such as ZnO and TiO are suitable because they reflect the harmful UV light, and enhance light stability of the coating. Certain fillers exhibit high viscosity at low shear force, capable of preventing the coating from creeping around the dimples. Other fillers are particularly effective in enhancing abrasion resistance of the coating layer, such as colloidal silica, which refers to silica in a single- or multi-solvent dispersion. The silica may be small spherical particles about 1 nm to about 200 nm in diameter, such as about 50 nm to about 100 nm. Such nano-sized silica particles have refractive indices particularly suitable for clear coatings; they pose limited scattering or interference to light transmission. The solvent may be water for water-reducible coating systems, or one or more monomers or oligomers of ketones or alcohols for dual cure systems that use a combination of two or more curing means (e.g., heating and UV irradiation). Suitable colloidal silica is either untreated or surface-pretreated, such as Cab-O-Sil® by Cabot Corp. of Tuscola, Ill., Nyacol® 2040 by Nano Technologies of Ashland, Mass., Hylink® OG by Clariant Corporation of Charlotte, N.C., and Snowtex® by Nissan Chemical Industries of Tokyo, Japan. The colloidal silica can be present in the coating material in an amount of at least about 5 weight percent of the coating composition, such as 5-80 weight percent, 10-60 weight percent, or 15-30 weight percent. Colloidal silica is distinct from solid silica such as hydrous silicic acid and silicic anhydride. One or more organic and/or inorganic hard materials capable of being triturated may be optionally incorporated into the colloidal silica. The hard material may have a Mohs hardness of at least about 5, and can be bound to the coating matrix through a coupling reaction. Suitable hard materials include, but are not limited to, silicates and oxides such as MgO, ZnO, or zirconium oxide. The hard particles, when present, may be in an amount of about 2 to about 25 weight percent of the coating composition, in addition to the colloidal silica.

An optional coupling agent may be used to bond the filler to the polymer matrix of the coating layer, to integrate the filler and keep it from sedimentation, and to promote adhesion and dispersion. Coupling agents are compounds having at least a first functionality linkable to the filler particle, and at least a second functionality linkable to the coating matrix or a reactive component therein. The first functional group includes hydroxy, phenoxy, hydroxy ether, silane, or aminoplast moieties. The second functional group includes hydroxy, iso(thio)cyanate, carboxyl, epoxy, amine, urea, vinyl, amide, aminoplast, or silane moieties. The coupling agent may have a polyvalent backbone comprising one or more silicone or phosphorus moieties and alkyl groups having 1 to about 12 carbon atoms. Suitable coupling agents may be oligomeric or polymeric acrylics, polyesters, polyethers, polyurethanes, polyamides, alkyds, or combinations of two or more thereof. Weight ratio of the coupling agent to the filler can be any amount that will result in the formation of a suitable abrasion resistant coating on a golf ball, such as 1:1 to 1:90, 1:1 to 1:40, or 1:6 to 1:12. The weight ratio of colloidal silica/coupling agent combo to the resin/curative combo may be 1:1 to 1:50, 1:1 to 1:10, or 1:4 to 1:8.

Suitable coupling agents include silane coupling agents such as amine-functional silanes and acryloxy-functional silanes, carbamate-functional coupling agents, chromates, titanates, zirconium, zircoaluminate, polymeric coupling agents, and combinations of two or more thereof. Exemplary silane coupling agents may have the formula $Y(CH_2)_nSiX_3$, where Y is an organofunctional group (e.g., a substituted or unsubstituted aryl, alkyl or carbocyclic group) bonding the polymer matrix to the central silicon atom via the stable $(CH_2)_n$ carbon chain, and X is a silicon-functional or alkoxy group (e.g., $OCH_3$, $OC_2H_5$, $OC_2H_4OCH_3$) that hydrolyzes and subsequently reacts with active sites on inorganic surfaces. Exemplary silane coupling agents include Silquest® A-174, A-1230, A-171, A-187, A-189, and A-1100 by OSi Specialties, Danbury, Conn., and silanes Z-6011, Z-6020, Z-6030, and Z-6040 by Dow Corning Corporation of Midland, Mich. Titanate coupling agents include, for example, monoalkoxy titanate compounds, chelate titanate compounds, quad titanate compounds, coordinate titanate compounds, neoalkoxy titanate compounds, cycloheteroatom titanate compounds, and those available from Du Pont Company of Wilmington, Del. Zirconium coupling agents include, for example, zircoaluminates, zirconium propionate, neoalkoxy zirconate, ammonium zirconium carbonate, and those available from Magnesium Elektron, Inc. of Flemington, N.J. Zircoaluminate coupling agents have both an aluminum and a zirconium functional group in addition to an organic functionality. Most preferable coupling agents for the present disclosure are silane coupling agents, including aminosilanes, mercaptosilanes, glycidoxysilanes, epoxysilanes, methacryloxysilanes, vinylsilanes, alkoxysilane oligomers, nonionic silane dispersing agents, octyltriethoxysilane, methyltriethoxysilane, methyltrimethoxysilane, vinyltriethoxysilane, vinyltrimethoxysilane, vinyltris(2-methoxyethoxy)silane, γ-methacryloxypropyltrimethoxysilane, β-(3,4-epoxycyclohexyl)-ethyltrimethoxysilane, γ-glycidoxypropyltrimethoxysilane, γ-mercaptopropyltrimethoxysilane, γ-aminopropyltriethoxysilane, aminoalkyl silicone solutions, modified aminoorganosilane, γ-aminopropyltrimethoxysilane, modified aminoorganosilane, β-(aminoethyl)-γ-aminopropyltrimethoxysilane, modified aminosilanes, triaminofunctional silanes, aminofunctional silanes, polyazamide silanes, γ-ureidopropyltriethoxysilane, isocyanatofunctional silanes; and mixtures thereof.

Other additive for the coating compositions of the present disclosure include, but are not limited to, crosslinkers such as polyfunctional aziridines to promote adhesion to the substrate and/or encasing layers, deaerating agents such as polyacrylates, flow control agents such as polysiloxanes, catalysts such as dibutyltin dilaurate, freezing point depressants, viscosity modifiers, release agents, compatibilizing agents, dispersing agents, olefins, acrylics, polyols, polyamines, hardeners, thinners, colorants including pigments, tints and dyes, optical brighteners, surfactants, lubricants, stabilizers, processing aids or oils to affect rheological and mixing properties, blowing agents, and any other modifying agents known to one of ordinary skill in the art. Pigments may be visible, fluorescent, autofluorescent, luminescent, or chemoluminescent, and include white pigments such as titanium oxide and zinc oxide. Additives may be blended into the coating composition in amounts sufficient to achieve their specific purposes and desired effects, such as about 10% by weight of the composition, or less.

The coating compositions according to the disclosure can be prepared in solvents that are inert with respect to iso(thio)cyanate groups and C=C double bonds, such as hydrocarbons, esters, ketones, ethers, ether esters, alkanes or aromatic solvents, such as xylene or toluene. The solvent may comprise any amounts in the composition, such as up to about 65% by weight, less than about 40%, less than about 20%, less than about 10%, or less than about 5%.

The coating layer of the present disclosure may have a substantial level of gloss, so that the resulting golf ball has an aesthetically pleasing appearance. The gloss of any surface is dependent on the underlying material composition, the surface smoothness, and its ability to reflect light, particularly visible light. Gloss is a measure of specular reflection: the higher the percentage of reflection, the glossier the surface. The level of gloss is typically measured with a gloss meter, which projects an illumination beam at an angle onto a sample surface, and measures the percentage of reflected light over a small range of the reflection angle that is registered by a detector. The illumination may be near infrared, which is almost impervious to ambient light or the effect of different colors. The illumination angle is critical, particularly for non-metals (coatings, plastics), because it is positively correlated to the amount of specular reflection. The difference between illumination and reflection is absorbed or diffusely scattered dependent on the material and its color. The result of reported by the gloss meter, in Gloss Units of 0 (completely transparent) to 100 (completely reflective) is normalized not against the amount of the incident light, but against the amount of reflected light from a black glass standard with a defined refractive index, which is calibrated to 100 Gloss Units. Measuring standards for gloss include ASTM D523-89, titled "Standard Test Method for Specular Gloss" and ASTM D2457-97, titled "Standard Test Method for Specular Gloss of Plastic Films and Solid Plastics." The coating layer of the present disclosure may have a 60° gloss of at least about 3, such as at least about 50, or about 80 to about 95. In one example, the coating layer may have a 20° gloss of at least about 5, such as at least about 30, or about 70 to about 95.

The coating layer may be substantially hydrophobic and color-stable, achievable by using substantially saturated components in the coating composition. The coating layer may also have other desirable physical properties, such as a cross hatch adhesion of about 90% to about 100% (based on ASTM D3359-02) and a pencil hardness of at least 3B, and up to 6H, such as 3H and 5H (based on ASTM D3363-00). Alternatively, the coating layer has a Sward Rocker hardness, as according to ASTM D2134, of less than 70, such as less than 40, or 40-70. The coating layer may have a solid content of greater than about 40%, such as at least about 60%, and up to about 100%. Other compatible one-part and/or two-part chemical systems may be used in combination with the coating compositions disclosed herein, either in the form of adjacent coating layers, or in blends prior to curing, or both. Like-parts may be mixed together, such as iso(thio)cyanates with iso(thio)cyanates, and resins with resins. These other coating compositions include, but are not limited to, polyurethanes, polyureas, acrylics, vinyl coatings, latex coatings, and the like or combinations thereof, such as those disclosed in U.S. Pat. Nos. 5,669,831, 5,744,549, 5,840,788, 6,019,921, 6,596,837, and 6,706,332, the disclosures of which are incorporated herein by reference in their entirety. One-component systems are generally made up of minute, polymeric, reacted or partially reacted resinous particles that are suspended or dispersed in one or more solvents. Suitable resins include, but are not limited to, acid functional resins or unsaturated resins, such as acrylics, polyethers, polyesters, polyamides, anhydrides, unsaturated carboxylic acid resins, unsaturated vinyl resins, and other radical polymerizable materials.

The coating layer of the present disclosure may be a clear or pigmented primer or topcoat, or a single layer combining the properties of both, formed onto a dimpled cover layer or outer cover layer through any methods known to one of ordinary skill in the art. The formulations are generally applied in a fluid form, providing a very thin coating layer of 0.0001-0.03 inches in thickness about the outer cover layer, such as 0.0002 inches, 0.0005 inches, 0.001 inches, 0.003 inches, 0.005 inches, 0.01 inches, or any ranges therebetween. The amount of the coating composition applied to a standard-sized golf ball of at least 1.68-inch in diameter is about 0.01 grams to about 1 gram. The coating layer may be disposed directly over one or more indicia layers. The indicia layer may be disposed directed over the outer surface of a cover or an outer cover layer. Alternatively, the indicia layer(s) may be disposed directly over the coating layer. The indicia layer can be formed from one or more radiation-curable ink compositions known to one skilled in the art, such as those disclosed in U.S. Pat. Nos. 5,968,605, 6,001,898, 6,013,330, 6,099,415, 6,248,804, 6,500,495, 6,646,021, among others, the disclosures of which are incorporated herein by reference in their entirety. The ink composition may comprise radiation-curable moieties (e.g., enic moieties) reactive or crosslinkable with the radiation-curable moieties in the coating composition. The coating composition disclosed herein is also suitable as a liquid phase carrier for ink particles in an ink composition that forms the indicia layer. The coating composition and the ink composition may co-cure simultaneously or at least overlap during the cure process, so that the radiation-curable moieties therein crosslink (e.g., covalently bond to each other) interfacially across the two layers, thereby strengthening the adhesion between the coating and indicia layers.

The coating composition according to the present disclosure can be applied with any one or more of the conventional application methods, such as casting, spraying, dipping, spin coating, electrostatic coating, flow coating, roller application, and/or others known to the skilled in the art. The coating layer may also be applied in a laminate form or by any other techniques known in the art. Choices for application methods and conditions may vary with material compositions. The applied coating composition can be cured in the following steps, wherein the steps may occur in any consecutive order or, alternatively, any two steps or all three steps may take place with overlap in time or even simultaneously:

1) Extraction of the optionally added solvents. This takes place at ambient temperature or elevated temperature, such as up to about 100° C. Thermal evaporation of the solvents can be achieved by conventional heating (such as using ovens) or by radiation (such as using infra red or near infra red radiators).

2) Curing the iso(thio)cyanate-containing components with the iso(thio)cyanate-reactive components. This addition reaction may take place above 0° C., such as at or above ambient temperature or at elevated temperature, advantageously below 150° C. Thermal curing involving elevated temperature can be achieved by conventional heating (such as using ovens) or by radiation (such as using infra red or near infra red radiators). This NCO-based curing is uniform on the substrate, taking place at relatively less accessible locations (for example, folds, wrap-rounds, angles or other concealed points).

3) Ionizing and/or actinic radiation curing. Ionizing radiation curing includes electron beam curing. Actinic radiation curing includes radio frequency, microwave, infra-red, visible, and UV curing (with commercial mercury high-pressure and medium-pressure radiators whereby it is possible for the radiators to be doped with other elements).

The actinic radiation curing may be allowed to proceed partially during the NCO-based curing. Likewise, the NCO-based curing may be induced at least partially during the actinic radiation curing or the solvent-extraction step, partly because of elevated temperature associated with these steps. The curing temperature may be less than about 80° C., such as less than about 60° C., or about 0° C. to about 50° C.

All components of the coating composition may be combined to form one-part formulations, but such systems may have a limited pot life. Another type of formulation is a two-part system with Part I comprising the radiation-curable iso(thio)cyanate, optionally in a mixture with one or more iso(thio)cyanates as disclosed herein, and Part II comprising all other components, including the iso(thio)cyanate-reactive chemicals. Parts I and II are storage-stable as long as the components themselves. Both parts are mixed in the specified ratio prior to application or applied by means of so-called two-part systems.

Two-part systems form the coating layer through a polymerization reaction of primary reactants upon mixing, optionally accompanied or followed by evaporation of the solvent(s). Coatings formed from two-part systems generally have good cure at ordinary temperatures, formation of strong and stable linkages, and flexibility in choices of reactants. These characteristics makes the coatings resistant to water and chemical attacks, superior in strength and durability, and allows a high degree of freedom in designing the coating with desired physical, chemical, and optical properties. The two-part polyurethane or polyurea systems of the present disclosure, when presented in a single- or multi-solvent dispersion, may have a medium to high solid content, with the percentage of solids by weight being greater than about 40% and by volume being greater than about 30%. The coating compositions may be based on water, non-aqueous solvents, or combinations thereof. Non-aqueous systems typically employ relatively high concentrations of one or more organic solvents; water is generally excluded from the reaction environment. However, organic solvents are expensive, hazardous (toxic and flammable), and undesirable especially for large-scale production.

Two-part, water-based polyurethane systems may be water-reducible in that the addition of water does not increase the tendency of foaming of the coating. Such a coating layer may eliminate the need for a primer coat or an adhesion promoting layer. Specific forms of aqueous coatings include aqueous solutions, emulsions, and colloidal dispersions. In the aqueous solution (of resin), the resin used may have a hydrophilic functional group, a curative may be used except when the resin is a particular alkyd resin; and heating and drying at high temperatures may be necessary. In the emulsion and colloidal dispersions, ions, hydrophilic polymers, and low-molecular emulsifiers are adsorbed or absorbed onto a hydrophobic polymer; the coating film formed has excellent water resistance and durability. For ease of processing, the coating system may have a pot life of at least about 30 minutes, such as about 2 hours, and a curing temperature of about 25° C. to about 90° C. To achieve desirable impact resistance, abrasion resistance, and the like, the coating layer may be thermoset, formed from a reactive liquid material.

A non-limiting exemplary formulation for the coating compositions of the present disclosure and its use in a three-piece golf ball is presented in Table I below. In the topcoat composition below, the NCO group and the NCO-reactive group (e.g., OH group) have a molar ratio of about 1:0.95. For coating compositions of the present disclosure, this molar ratio may be between 1:0.8 and 1:1.05.

TABLE I

| Layer/Property | Thickness/Diameter | Material Composition |
| --- | --- | --- |
| Core | 1.55 inches in diameter | Polybutadiene/ZDA |
| Inner Cover Layer | 0.035 inches thick | Blend of Na & Li Ionomers |
| Outer Cover Layer Primer | 0.03 inches thick | Aromatic Polyurethane 100 phr Waterborne Clear Polyurethane, 1.5 phr Aziridine Crosslinker |
| Indicia Layer | | 3.5% Pigment Ink |
| Topcoat Layer | | 100 phr Polyol Package[1], 63.7 phr Acryloyl Polyisocyanate[2] |

[1]Available from PPG, consisting 19.2 phr diisobutyl ketone, 31.9 phr methyl isobutyl ketone, 0.24 phr optical brightener (RC-B Thiopene from Wujin Fine Chemicals or Q-OB from NY Fine Chemicals), 1.43 phr cellulose acetate butyrate, 1.33 phr Tinuvin® 328, 41.5 phr polyester urethane polyol (HRB-4856 from PPG), 4.4 phr polyether polyol (Terathane® 1000 from DuPont).
[2]Adduct of solvent-free HDI trimer and 2-hydroxyethyl acrylate (weight ratio of 19:1), NCO equivalent weight about 192, thinned to 60% solids in methyl isobutyl ketone.

The coating layer of the present disclosure may be relatively soft and durable, suitable for applications in sporting equipment in general. The coating layer can be used in golf equipment, including, but not limited to, golf balls; golf clubs (i.e., putters, drivers, and wedges) and club attachments, additions, or modifications, such as striking face inserts, back cavity of an iron-type club, crown or sole of a metal wood-type club; golf club components (i.e., shafts, hosels, and grips); golf club vibration damping devices; golf gloves and portions thereof, such as glove liners, securing methods, patches, and reinforcements; golf shoes and associated components (i.e., soles, footbeds and spike socket spines, heel counters, toe "puffs," uppers, insoles, midsoles, outsoles, liners, and plastic golf spikes); golf bags and their associated framework, support legs, and stands; and any portion of the above items. When used on an outermost surface of a golf ball or a club face, substantially all of the coating layer remains adhered thereto after repeated impact between the golf ball and the club face, such as at least about 90 weight percent, at least about 95 weight percent, or at least about 99 weight percent.

Golf balls of the present disclosure may have a variety of constructions, comprising at least a core and a cover, optionally one or more layers disposed in the core, the cover, and/or between the core and the cover. The core may be a single solid mass, or include a center and one or more outer core layers. The center may further be solid, liquid-filled, gel-filled, or gas-filled. The cover may include an outer cover layer and, optionally, one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The golf ball core may be solid and made from any suitable core materials including thermosets such as natural rubber, polybutadiene, polyisoprene, styrene-butadiene or styrene-propylene-diene rubber, and thermoplastics such as ionomer resins, polyamides, polyesters, or a thermoplastic elastomer. The core can also be formed from a castable material such as polyurethanes, polyureas, epoxies, silicones, etc. Non-limiting examples of solid core compositions include a base rubber, a crosslinking agent, and an initiator. The base rubber may be 1,4-polybutadiene having a cis-bond of at least about 40%, a Mooney viscosity of at least about 30, a molecular weight of at least about 150,000, and a polydispersity of less than about 4. Blends of two or more of such polybutadienes and blends of such polybutadiene with any one or more of the other rubbers as disclosed herein are all suitable as the base rubber.

Suitable crosslinking agents include metal salts of unsaturated fatty acids having 3 to 8 carbon atoms, such as zinc diacrylate, zinc dimethacrylate, and blends thereof, present in an amount of 15-60 parts per 100 parts by weight of the base rubber (phr). The initiator includes organic peroxide compounds and azo initiators, such as dicumyl peroxide, present in an amount of 0.5-2.5 phr. Halogenated organosulfur compounds such as pentachlorothiophenol ("PCTP") and ZnPCTP can be blended into the base rubber in an amount of 0.1-2 phr or 2-5 phr. The core may also include fillers such as tungsten powder and zinc oxide to adjust hardness, strength, weight, density and/or specific gravity. Other optional additives include antioxidants, accelerators, processing aids or oils, cis-to-trans catalysts, coupling agents, stable free radicals, radical scavangers, scorch retarders, and blends thereof, used in amounts sufficient to achieve their specific purposes and desired effects. The core may have a diameter of at least 0.5 inches, such as at least 1 inch, 1.5-1.65 inches, or 1.55-1.6 inches, a compression of 20-120, such as 30-100, 40-80, or less than 20, an coefficient of restitution of at least 0.75, such as at least 0.8. Conventional methods and techniques may be used to form the cores.

The cover may comprise a single layer, or an outer cover layer and one or more inner cover layer(s). The cover layer, particularly the outer cover layer, may comprise 1-100 weight percent, such as 5-95 weight percent, of an ethylene/acid ionomer or non-ionomeric polymer, a grafted or non-grafted metallocene-catalyzed polymer, or a thermoplastic or thermoset reaction product, such as Surlyn® and Nucrel® from E. I. DuPont de Nemours & Company, Iotek® and Escor® from ExxonMobil, thermoplastic or thermoset (vulcanized) synthetic or natural rubbers, polyolefins and copolymers or blends thereof, polyphenylene oxide resins, polyarylene ethers, blends such as Noryl® from General Electric Company, polyesters, polycarbonates, polyacetals, polyimides, polyetherketones, polyamideimides, thermoplastic block copolymers (Kraton® rubbers from Shell Chemical), co-polyetheramides (Pebax® from AtoFina), elastomers in general, vinyl resins such as polyvinyl alcohols, polyvinyl alcohol copolymers, polyvinyl chloride, block copolymers of alkenyl aromatics with vinyl aromatics and polyesteramides, copolymers of vinyl chloride with vinyl acetate, acrylic esters or vinylidene chloride, polyamides such as poly(hexamethylene adipamide) and others prepared from diamines, fatty acids, dibasic acids, and amino acids (poly(caprolactam)), acrylic resins, and blends and alloys, including blends of polycarbonate and acrylonitrile-butylene-styrene, blends of polycarbonate and polyurethane, blends of polyvinyl chloride with acrylonitrile-butadiene-styrene or ethylene vinyl acetate or other elastomers, blends of thermoplastic rubbers with polyethylene or polypropylene.

Thermoplastic or thermoset reaction products include those formed from liquid reactive materials, such as polyurethane, polyurea, and polyurethane/polyurea hybrid comprising a polyahl, an iso(thio)cyanate, and a curing agent. The polyahls include polyol and/or polyamine telechelics having a molecular weight of 500-15,000, such as polyoxybutylene polyols and/or polyamines. Iso(thio)cyanates include diiso(thio)cyanates, triiso(thio)cyanates, dimers thereof, trimers thereof, and others known to one skilled in the art. Curing agents include monomeric, oligomeric, and polymeric compounds used in cover compositions for chain-extension and/or crosslink. Suitable curing agents include epoxies, hydroxy curatives, amine curatives, and amino alcohol curatives having a molecular weight of about 50 to about 2,000. Any and all reactants in the reactive compositions may be substantially saturated. Various additives include, but are not limited to, catalysts such as dibutyltin dilaurate, UV absorbers, hindered amine light stabilizers, antioxidants, accelerators, fillers, viscosity modifiers, release agents, plasticizers, compatibilizing agents, coupling agents, dispersing agents, colorants including pigments and dyes, optical brighteners, surfactants, lubricants, stabilizers, metals, processing aids or oils, blowing agents, freezing point depressants, and any other modifying agents known to one skilled in the art.

The cover layer may have a flexural modulus of at least about 1,000 psi, such as 10,000-80,000 psi. material hardness between about 20 Shore D and about 75 Shore D, such as 30-60, and a hardness as measured on the ball of less than about 80 Shore D. Cover layers about 0.01-0.04 inches thick may be suitable for high swing speed plays, while cover layers about 0.04-0.08 inches, such as 0.05-0.07 inches, are suitable for moderate swing speed plays. Alternatively, the cover thickness can be 0.03 inches or less.

Any method known to one of ordinary skill in the art may be used to produce the cover layers, and include, without limitation, casting, compression molding, reaction injection molding ("RIM"), liquid injection molding ("LIM"), injection-compression molding, pre-reacting the components to form an injection moldable thermoplastic material and then injection molding, and combinations thereof, such as RIM/compression molding, injection/compression molding, progressive compression molding, and the like. Thermoplastic formulations may be processed using any number of compression or injection molding techniques. Thermoset formulations may be castable, reaction injection moldable, sprayable, or applied in a laminate form or by any techniques known in the art. Castable reactive liquid materials can provide very thin layers such as outer cover layers that are desirable on golf balls.

One or more optional intermediate layers, such as a barrier layer, may be disposed in the core, in the cover, and/or between the core and the cover. The intermediate layer may be an inner cover layer, formed from non-ionomeric acid polymers or ionomeric derivatives thereof, polyamides, polyolefins, polyurethanes, polyureas, epoxies, polyethers, polyesters, polyetheresters such as Hytrel® from DuPont, polyetheramides such as Pebax® from AtoFina, nylons, metallocene-catalyzed polymers, styrenic block copolymers such as Kraton® from Shell Chemicals, acrylonitrile-butadiene-styrene copolymers ("ABS"), polyvinyl chlorides, polyvinyl alcohol copolymers, polycarbonates, polyesteramides, polyamides, polyimides, polyetherketones, polyamideimides, silicones, metal salts of fatty acids, and/or combinations thereof, such as blends of polycarbonate and acrylonitrile-butadiene-styrene, blends of polycarbonate and polyurethane.

The intermediate layer may incorporate one or more fillers to attain certain physical and mechanical properties. Its composition may have a modulus of 2,000-150,000 psi, a material hardness of 60-80 Shore D, and/or a thickness of 0.005-0.6 inch. The composition may be applied as a liquid, powder, dispersion, lacquer, paste, gel, melt, or solid half shells. The intermediate layer may be formed around the core or onto the inside of the cover by sheet stock or vacuum shrink-wrapping, pre-form molding, compression molding, progressive compression molding, injection molding, co-injection molding, vacuum deposition, RIM, lamination, casting, simplified casting, spraying, dipping, powder coating, or a combination thereof.

The golf ball of the present disclosure may have a coefficient of restitution of greater than 0.79, a compression of less than 110, a deflection at 100 kg of greater than 1.5 mm, and an overall diameter of at least 1.68 inches, such as 1.68-1.76 inches. At least 60% of the outermost surface should be covered by about 250-450 dimples of equal or different shape and size. The dimple patterns may involve catenary curves.

All patents and patent applications cited in the foregoing text are expressly incorporated herein by reference in their entirety.

The disclosure and claims presented herein are not to be limited in scope by the illustrative examples described herein. Any equivalents and various modifications apparent to those skilled in the art are intended to be within the scope of this disclosure. It is further understood that the various features of the present disclosure can be used singly or in combination thereof. Such modifications and combinations are also intended to fall within the scope of the appended claims.

What is claimed is:

1. A golf ball comprising a core, a cover layer encasing the core and at least one coating layer encasing the cover layer, wherein the coating layer is formed of a two-part, reactive composition comprising:
    a first part comprising 5% or greater of a radiation-curable iso(thio)cyanate, wherein each molecule has at least one non-aromatic carbon-carbon unsaturation; and
    a second part comprising at least one iso(thio)cyanate-reactive chemical;
    wherein the golf ball further comprises at least one indicia layer adjoining the coating layer, and wherein the indicia layer is formed from an ink composition comprising one or more radiation-curable moieties crosslinkable to the radiation-curable iso(thio)cyanate in the coating layer.

2. The golf ball of claim 1, wherein the radiation-curable moieties in the ink composition comprises (meth)acryloyl moieties.

3. The golf ball of claim 1, wherein the ink composition comprises at least one radiation-curable iso(thio)cyanate.

4. The golf ball of claim 1, wherein the iso(thio)cyanate-reactive chemical is selected from the group consisting of polyester polyamines and polycaprolactone polyamines.

5. A golf ball comprising a core, a cover layer encasing the core, and at least one coating layer encasing The cover layer, wherein the coating layer is formed of a two-part, reactive composition comprising:
    a first part comprising 5% or greater of a radiation-curable iso(thio)cyanate; and
    a second part comprising at least one iso(thio)cyanate-reactive chemical selected from the group consisting of polyester polyamines and polycaprolactone polyamines;
    wherein the golf ball further comprises at least one indicia layer adjoining the coating layer, and wherein the indicia layer is formed from an ink composition comprising one or more radiation-curable moieties crosslinkable to the radiation-curable iso(thio)cyanate in the coating layer.

6. A golf ball comprising a core, a cover layer encasing the core, and at least one coating layer encasing the cover layer, wherein the coating layer is formed of a two-part, reactive composition consisting essentially of:
   a radiation-curable iso(thio)cyanate, wherein each molecule has at least one non-aromatic carbon-carbon unsaturation; and
   an iso(thio)cyanate-reactive chemical;
   wherein the golf ball farther comprises at least one indicia layer adjoining the coating layer, and wherein the indicia layer is formed from an ink composition comprising one or more radiation-curable moieties crosslinkable to the radiation-curable iso(thio)cyanate in the coating layer.

7. The golf ball of claim 6, wherein the iso(thio)cyanate-reactive chemical is selected from the group consisting of polyester polyamines and polycaprolactone polyamines.

* * * * *